(12) United States Patent
Kataoka et al.

(10) Patent No.: US 7,830,051 B2
(45) Date of Patent: Nov. 9, 2010

(54) RESOLVER, MANUFACTURING METHOD THEREOF, AND MOTOR USING THE RESOLVER

(75) Inventors: Nakaba Kataoka, Kyoto (JP); Takahiro Hattori, Kyoto (JP); Keita Nakanishi, Kyoto (JP)

(73) Assignee: Nidec Corporation, Kyoto (JP)

( * ) Notice: Subject to any disclaimer, the term of this patent is extended or adjusted under 35 U.S.C. 154(b) by 307 days.

(21) Appl. No.: 11/971,924

(22) Filed: Jan. 10, 2008

(65) Prior Publication Data
US 2008/0169714 A1 Jul. 17, 2008

(30) Foreign Application Priority Data
Jan. 12, 2007 (JP) ............................. 2007-005201

(51) Int. Cl.
*H02K 24/00* (2006.01)
(52) U.S. Cl. ........................................................ 310/71
(58) Field of Classification Search ................... 310/42, 310/71; 174/128.1
See application file for complete search history.

(56) References Cited

U.S. PATENT DOCUMENTS

| | | | |
|---|---|---|---|
| 5,920,135 A * | 7/1999 | Ohshita | 310/71 |
| 6,031,307 A | 2/2000 | Ohshita | |
| 6,044,545 A | 4/2000 | Ohshita | |
| 6,724,109 B2 * | 4/2004 | Mimura | 310/71 |
| 6,815,853 B2 * | 11/2004 | Koyama et al. | 310/71 |
| 6,933,636 B2 * | 8/2005 | Miya et al. | 310/71 |
| 7,105,961 B2 * | 9/2006 | Tetsuka et al. | 310/71 |
| 7,145,082 B2 * | 12/2006 | Hochleithner et al. | 174/113 C |
| 7,159,296 B2 * | 1/2007 | Miya et al. | 29/598 |
| 7,309,936 B2 * | 12/2007 | Utsumi et al. | 310/71 |
| 7,755,231 B2 * | 7/2010 | Kataoka et al. | 310/71 |

FOREIGN PATENT DOCUMENTS

| | | |
|---|---|---|
| JP | 3251560 B2 | 1/2002 |
| JP | 2002-272050 A | 9/2002 |
| JP | 3641466 B2 | 4/2005 |

* cited by examiner

*Primary Examiner*—Burton Mullins
(74) *Attorney, Agent, or Firm*—Keating & Bennett, LLP

(57) ABSTRACT

A resolver includes a terminal block having a plurality of terminals integrally formed therein. Each of the terminals has a conductive wire connecting portion arranged to allow a conductive wire of a resolver stator to be fixed thereto and a lead wire connecting portion which allows a lead wire to be connected thereto. Ultrasonic welding is carried out to join the lead wire connecting portion and a connecting end of the lead wire.

13 Claims, 21 Drawing Sheets

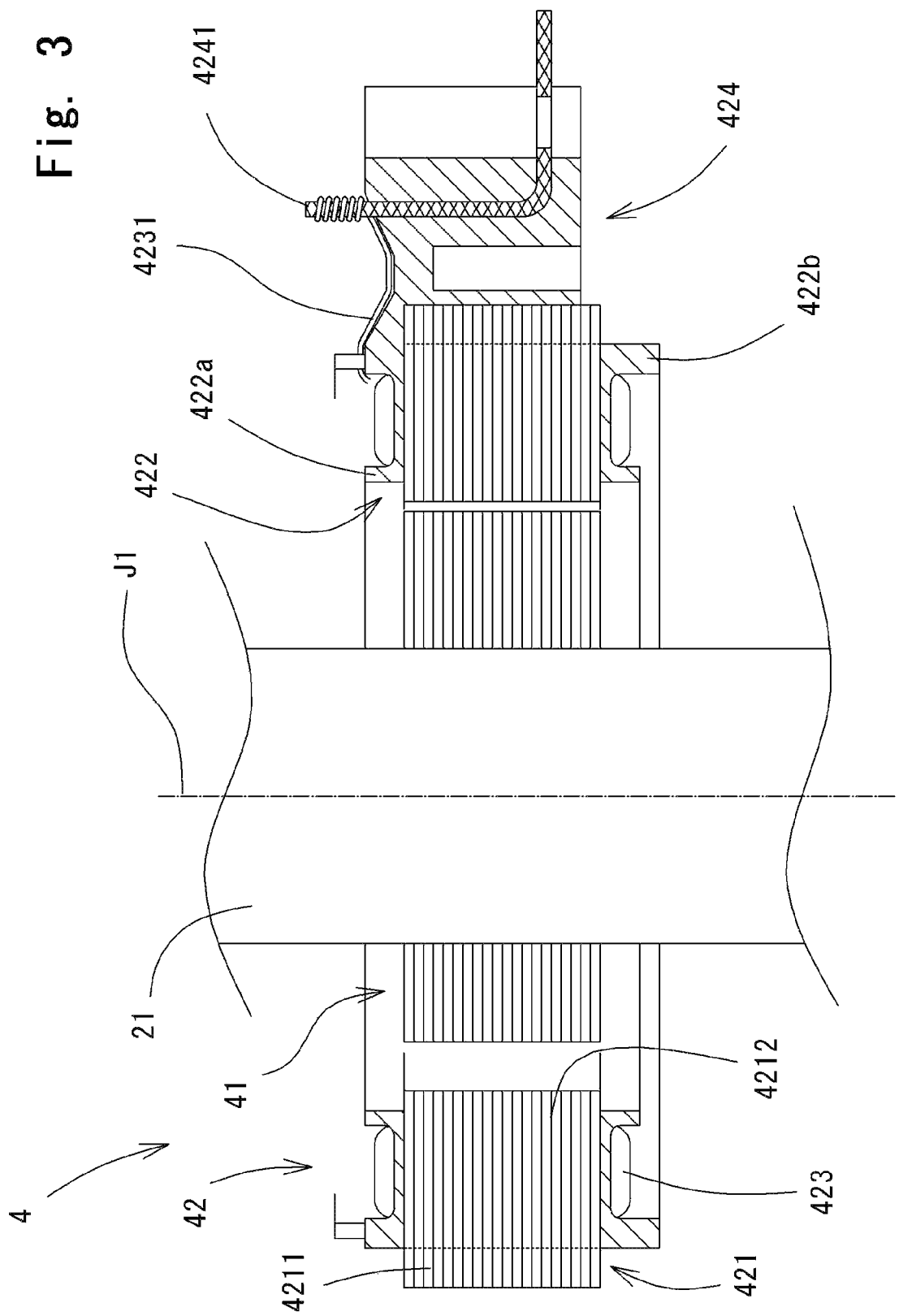

RESOLVER, MANUFACTURING METHOD THEREOF, AND MOTOR USING THE RESOLVER

BACKGROUND OF THE INVENTION

1. Field of the Invention

The present invention relates to a resolver for detecting a rotational position of a rotating body, and a motor using the resolver. In particular, the present invention relates to a connecting structure between a lead wire and a terminal in the resolver, and a manufacturing method of the resolver.

2. Description of the Related Art

A resolver is a rotational position detector for detecting with a high degree of accuracy a position of a rotating body in a rotation circumferential direction. In such a resolver, a rotor rotates about a predetermined central axis to detect the position of the rotating body in accordance with a waveform of a voltage generated by a conductor wound around an armature due to electromagnetic induction.

Since the resolver is excellent in environmental resistance and is capable of detecting with high accuracy the rotational position of the rotating body, the resolver is sometimes used in a brushless motor mounted in a power steering device for assisting handling of a steering wheel in a vehicle. As various electronic devices are mounted in the vehicle due to improvement in function thereof, the brushless motor needs to occupy a smaller amount of space. Accordingly, the brushless motor needs to be reduced in size, thereby increasing a demand for a smaller resolver.

A major factor inhibiting realization of the smaller resolver is that a connecting structure between an external control circuit unit and the resolver is large. Referring to FIGS. 19 and 20, a connecting structure between a conventional resolver and a control circuit unit will be described. FIG. 19 is a cross-sectional view of an exemplary conventional resolver 100. FIG. 20 is a view partially showing a terminal block 121.

Referring to FIGS. 19 and 20, in a connecting structure between a control circuit unit (not shown) and the resolver 100, the terminal block 121 radially projecting in the resolver 100 is connected to lead wires 1213 for electrically connecting the control circuit unit and the resolver 100 to each other.

Referring to FIG. 19, the resolver 100 includes a rotor core 110 rotating about a central axis J1, and a stator 120 surrounding the rotor core 110. The stator 120 is integrally provided with the terminal block 121 radially projecting from an outer peripheral surface of the stator 120.

Referring to FIG. 20, the terminal block 121 is formed with a plurality of terminals 1211 axially penetrating the terminal block 121, a printed circuit board 1212 fixed to lower portions of the plurality of terminals 1211 by soldering, and the plurality of lead wires 1213 soldered to the printed circuit board 1212. The printed circuit board 1212 is formed with wiring patterns 1214 electrically connecting the respective plurality of terminals 1211 and the lead wires 1213 corresponding thereto to each other.

In such connecting structures, the plurality of conventional terminals 1211 and the corresponding lead wires 1213 are respectively soldered, so that a land for soldering needs to be provided for each of the connecting structures. In such a case, a distance between the adjacent terminals 1211 and a distance between the adjacent lead wires 1213 should be set equal to a sum of a width of a land 1215 and a distance between the adjacent lands 1215, and therefore, the terminal block 121 needs to be made large. As a result, the resolver 100 has not been able to be reduced in size.

In addition, since the plurality of terminals 1211 and the plurality of lead wires 1213 are soldered to the printed circuit board 1212, the resolver 100 has a structure of low reliability in which the terminals 1211 and the lead wires 1213 tend to be disconnected due to vibration, external impact, and the like.

SUMMARY OF THE INVENTION

According to preferred embodiments of the present invention, a resolver includes a resolver rotor having an outer peripheral surface having an imperfect circle shape and rotating about a predetermined central axis serving as a rotational axis, a resolver stator having an inner peripheral surface facing, with the central axis as a center, the outer peripheral surface of the resolver rotor with a radial space therebetween, and a lead wire for electrically connecting the resolver and another device to each other.

The resolver stator has a core back portion having a substantially annular shape, a resolver stator core provided with a plurality of teeth circumferentially spaced apart from one another and extending from the core back portion toward the central axis, an insulator arranged to cover the plurality of teeth of the resolver stator core, and coil windings each formed by winding a conductive wire from an outer side of the insulator.

The insulator is integrally formed with a terminal block extending radially outwards from the resolver stator core. The terminal block has a plurality of terminals for electrically connecting the conductive wire and the lead wire to each other. There is formed a melted portion in which the lead wire and the terminal are mixedly melted together. In particular, the lead wire and the terminal are fixed to each other preferably by ultrasonic welding, for example.

According to the preferred embodiments of the present invention, as the melted portion is formed on a contact surface between the lead wire and the terminal, the contact surface serves as a joint surface. Thus, the entire melted portion can be uniformly joined to increase joint strength. Therefore, there is provided a resolver of high reliability preventing disconnection of the lead wire from the terminal.

Other features, elements, advantages and characteristics of the present invention will become more apparent from the following detailed description of preferred embodiments thereof with reference to the attached drawings.

BRIEF DESCRIPTION OF THE DRAWINGS

FIG. 3 is a cross-sectional view of the resolver, cut along the axial direction.

DETAILED DESCRIPTION OF PREFERRED EMBODIMENTS

Figure 1:
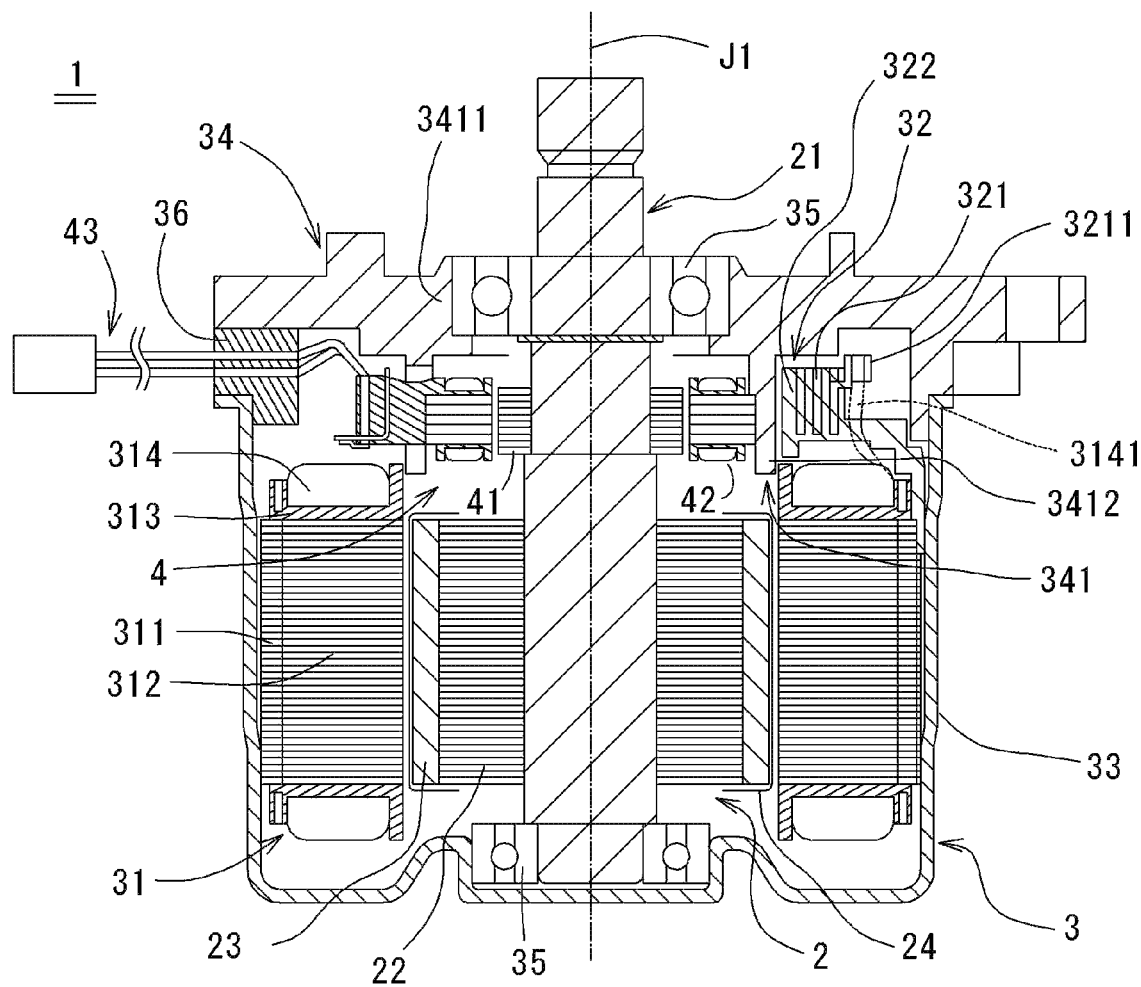
FIG. 1 is a cross-sectional view of a motor according to a preferred embodiment of the present invention, cut along its axial direction.

Referring to FIGS. 1 through 18, preferred embodiments of the present invention will be described in detail. It should be noted that in the explanation of the present invention, when positional relationships among and orientations of the different components are described as being up/down or left/right, ultimately positional relationships and orientations that are in the drawings are indicated; positional relationships among and orientations of the components once having been assembled into an actual device are not indicated. Meanwhile, in the following description, an axial direction indicates a direction parallel to a rotation axis, and a radial direction indicates a direction perpendicular to the rotation axis.

Entire Structure of Motor

Referring to FIG. 1, there is described an entire structure of a motor according to a preferred embodiment of the present invention. FIG. 1 is a cross-sectional view of the motor according to the preferred embodiment, cut along its axial direction. Hereinafter, description is made with an assumption that a bracket is located an upper side while a bottom of a covering body is located on a lower side. Such upper and lower sides may not necessarily be aligned with a direction of gravitational force.

Referring to FIG. 1, the motor 1 includes a rotor 2 which can rotate about a central axis J1 serving as a rotational axis, a stator 3 disposed radially outside the rotor 2 to surround the same and supporting the rotor 2 in a rotatable manner, and a resolver 4 serving as a rotational position detection mechanism which detects a rotational position of the rotor 2.

The motor 1 of this preferred embodiment can be used as a brushless motor mounted in an electric power steering device (not shown) for assisting handling of a steering wheel in a vehicle, for example. When the motor 1 of this preferred embodiment is used in the electric power steering device, the steering wheel can be smoothly handled due to the motor 1 of high accuracy in rotational position detection.

The rotor 2 includes a shaft 21 which can rotate coaxially with the central axis J1, a yoke 22 having a substantially cylindrical shape and fixed to an outer peripheral surface of the shaft 21, a rotor magnet 23 circumferentially fixed to an outer peripheral surface of the yoke 22, and a rotor cover 24 which covers the rotor magnet 23 from axially and radially outer sides thereof as well as from upper and lower sides of the yoke 22 in order to prevent the rotor magnet 23 from being shattered.

The yoke 22 preferably has a substantially cylindrical shape with a plurality of axially laminated magnetic steel plates each pressed into a thin plate having a substantially circular disk shape. The rotor cover 24 is preferably made of a non-magnetic material. The rotor cover 24 has end surfaces for respectively covering axial end surfaces of the rotor magnet 23 and outer peripheral parts of axial end surfaces of the yoke 22, and a cylindrical portion covering an axial outer peripheral surface of the rotor magnet 23. In this preferred embodiment, the rotor cover 24 is preferably made of non-magnetic stainless steel, for example.

The stator 3 includes an armature 31 that is radially spaced apart from the outer peripheral surface of the rotor magnet 23 and generating a rotating magnetic field, a bus bar unit 32 which connects the armature 31 and an external power source (not shown) to each other, a covering body 33 which accommodates the above-described portions, and a bracket 34 which seals an opened side of the covering body 33. The covering body 33 and the bracket 34 are respectively provided with ball bearings 35. These ball bearings 35 are fixed to the shaft 21 so that the rotor 2 is rotatably supported about the central axis J1.

The armature 31 preferably includes: a core back portion 311 having a substantially annular shape; a plurality of teeth 312 each extending from the core back portion 311 toward the central axis J1 and circumferentially spaced apart from one another; insulators 313 each made of insulating material and having an approximately U-shape in cross section and covering the teeth 312 and an upper surface and an inner peripheral surface of the core back portion 311 respectively from upper and lower sides; and coil windings 314 formed by winding a plurality of coil wires 3141 from an upper side of the insulator 313 so as to be accumulated around each of the teeth 312.

The covering body 33 has a substantially cylindrical portion radially facing an outer peripheral surface of the core back portion 311 of the armature 31, and a bottom portion which covers the armature 31 from a lower side thereof. In this preferred embodiment, the covering body 33 is preferably formed as a single member integrally having the cylindrical portion and the bottom portion by pressing a magnetic steel plate, for example.

The bus bar unit 32 includes a plurality of switchboards 321 each having a circular arc shape and electrically connecting the armature 31 and the external power source to each other, and a holder 322 made of resin material and having an approximately circular arc shape and holding the plurality of switchboards 321. Each of the switchboards 321 includes a plurality of terminals 3211 to be respectively connected to the armature 31.

The bracket 34 is formed with a central cylindrical portion 341 extending downwards about the central axis J1. The central cylindrical portion 341 is formed with a ball bearing holding portion 3411 which holds the ball bearing 35, and a resolver stator holding portion 3412 which holds a resolver stator 42 (to be described later) of the resolver 4. The ball bearing holding portion 3411 and the resolver stator holding portion 3412 are coaxial with each other.

The resolver 4 includes a resolver rotor 41 fixed to the shaft 21, and the resolver stator 42 having an inner peripheral surface which surrounds an outer peripheral surface of the resolver rotor 41 with a gap therebetween. The inner peripheral surface of the resolver stator 42 is radially opposed to the outer peripheral surface of the resolver rotor 41 with a gap arranged therebetween. Lead wires 43 are fixed to the resolver stator 42. The lead wires 43 are extended outwards from the motor 1 through a rubber bush 36 interposed between the covering body 33 and the bracket 34.

When an electric current flows into the armature 31 from the external power source through the switchboards 321, a rotating magnetic field is generated around the armature 31. Due to interaction between the rotating magnetic field and the rotor magnet 23, the rotor 2 is provided with rotary torque about the central axis J1.

Structure of Resolver

Figure 2:
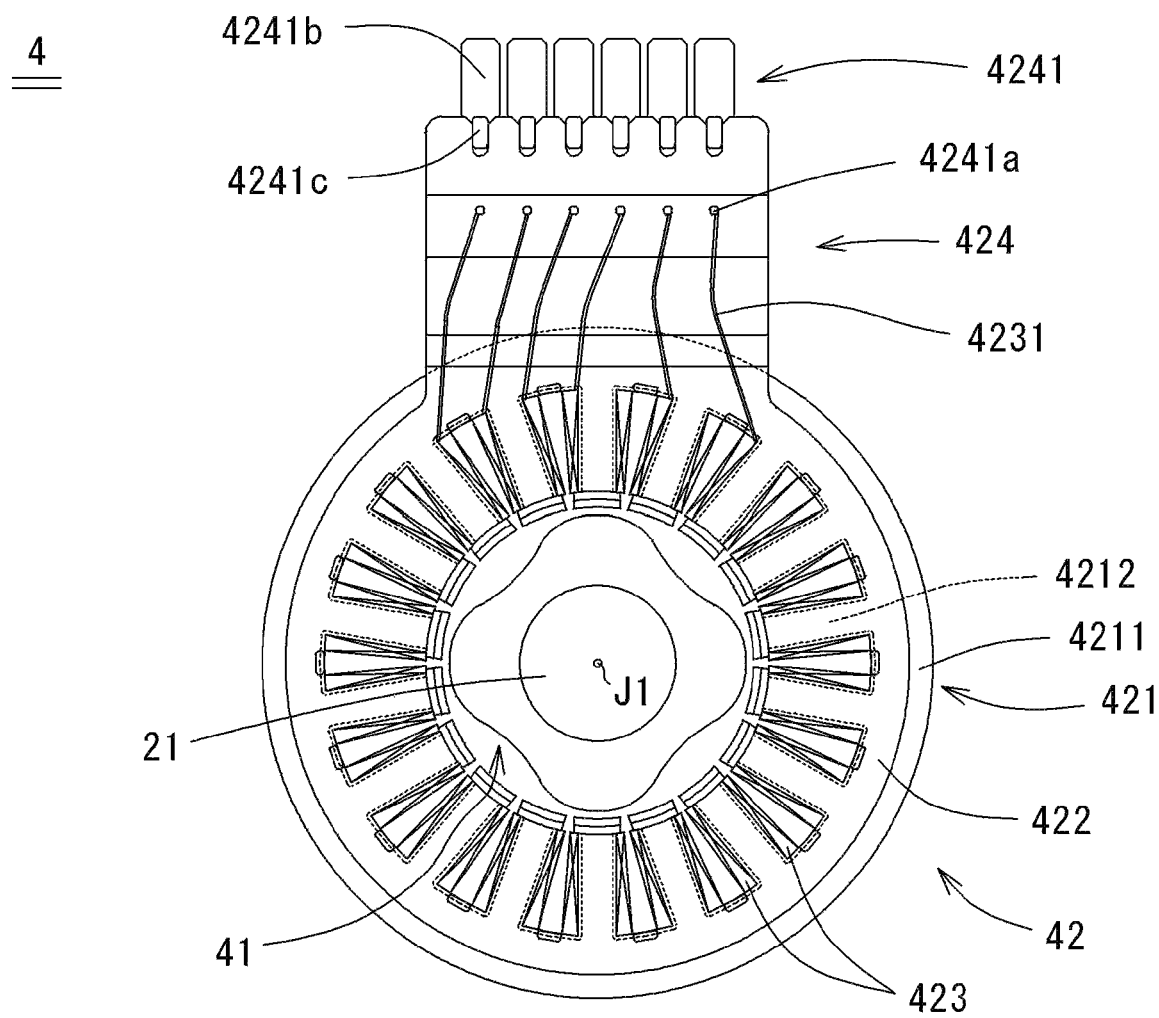
FIG. 2 is a top view of a resolver of the motor of FIG. 1.

Referring to FIGS. 2 and 3, there is described an entire structure of the resolver 4 according to the present preferred embodiment. FIG. 2 is a top view of the resolver 4. FIG. 3 is a cross-sectional view of the resolver 4 cut along the axial direction.

Referring to FIGS. 2 and 3, the resolver rotor 41 is formed by a plurality of laminated magnetic steel plates, and has the outer peripheral surface in a non-circular shape. The resolver rotor 41 is fixed to the shaft 21 so as to be rotated coaxially with the central axis J1.

The resolver stator 42 includes a resolver stator core 421, an insulator 422, and coil windings 423. The resolver stator core 421 is formed of a plurality of laminated magnetic steel plates, and has a core back portion 4211 having an approximately annular shape and a plurality of teeth 4212 circumferentially spaced apart from one another and extending from the core back portion 4211 toward the central axis J1. The insulator 422 is preferably made of resin, for example, and covers both axial end surfaces and an inner peripheral surface of the core back portion 4211 and both circumferential side surfaces and both axial end surfaces of the teeth 4212. The coil windings 423 are formed by winding a plurality of conductive wires 4231 from an upper side of the insulator 422 so as to be accumulated around each of the teeth 4212. Each of the coil windings 423 is formed as a concentrated winding around each of the teeth 4212.

Referring to FIG. 3, the insulator 422 preferably includes two members, namely, an upper insulator 422a and a lower insulator 422b which respectively cover the teeth 4212 from axially above and below. Each of the upper insulator 422a and the lower insulator 422b preferably is integrally formed by injection molding a resin material. The upper insulator 422a is provided with a terminal block 424 integrally formed therewith. The terminal block 424 projects radially outwards from the resolver stator core 421. The terminal block 424 is provided with a plurality of terminals 4241 each preferably having a substantially L-shape in cross section and projecting radially outwards from an upper surface of the terminal block 424. The lead wire 43 (not shown) is fixed to each of the terminals 4241 preferably via ultrasonic welding, for example. In this preferred embodiment, six terminals 4241 are preferably provided, for example.

Structure of Lead Wire

Figure 4A:
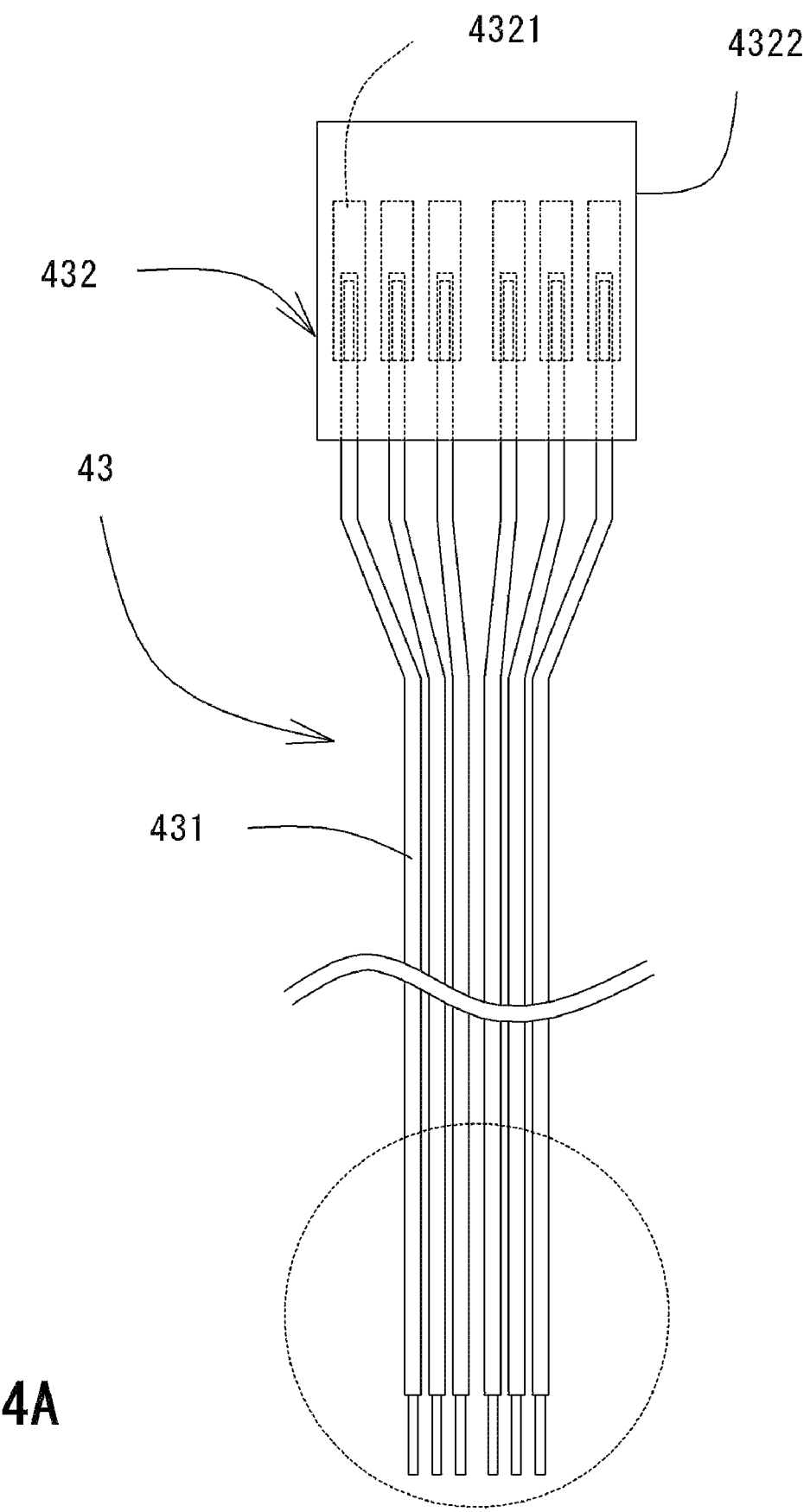
FIG. 4A is a plan view of a lead wire according to a preferred embodiment of the present invention.
Figure 4B:
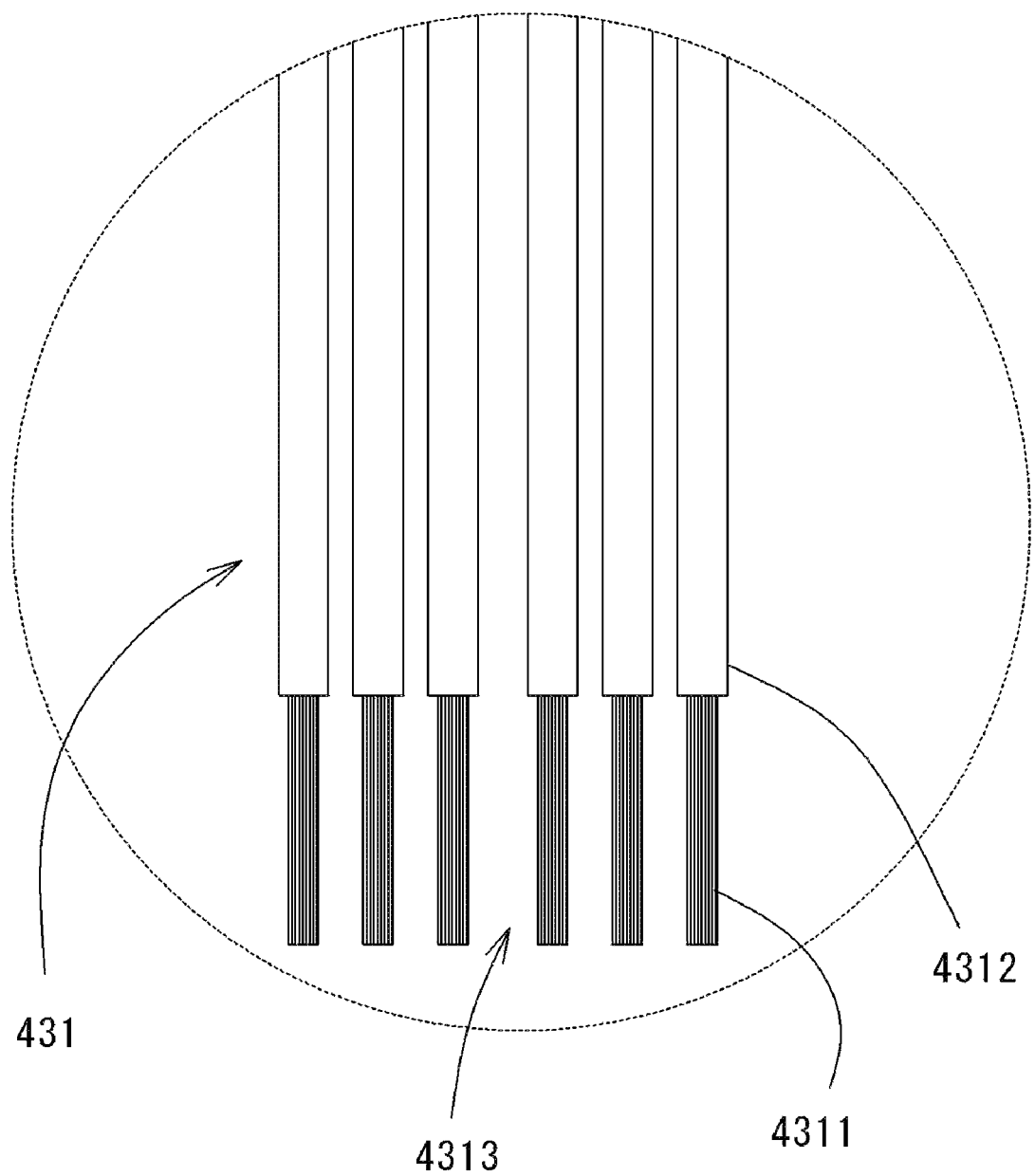
FIG. 4B is an enlarged view of a connecting end of the lead wire in FIG. 4A and a periphery thereof.

Referring to FIGS. 4A and 4B, there is described a structure of the lead wire 43 connected to the terminal 4241 of the resolver 4 in this preferred embodiment. FIG. 4A is a plan view of the lead wire 43 and FIG. 4B is an enlarged view of ends of conductors 431.

Referring to FIG. 4A, the lead wire 43 preferably includes the plurality of conductors 431, the number thereof preferably corresponding to the number of the terminals 4241, and a connecter 432 connected to the ends of the plurality of conductors 431. In this preferred embodiment, six conductors 431 are preferably provided, for example.

Referring to FIG. 4B, the conductor 431 preferably includes a plurality of copper wires 4311 which are covered integrally with an insulating film 4312. At the both ends of the conductor 431, the insulating film 4312 is removed to expose the plurality of copper wires 4311. One of the ends of the conductor 431 is referred to as a connecting end 4313 to be connected to the terminal 4241 on the terminal block 424.

Referring to FIG. 4A, the connector 432 includes contacts 4321 each formed of a conductive material and allowing each of the ends of the conductors 431 to be pressure bonded thereto, and a housing 4322 which holds the contacts 4321. Electrical conduction is achieved by connecting the contact 4321 to a connector (not shown) of a control circuit unit (not shown).

Detailed Structure of Terminal

Figure 5:
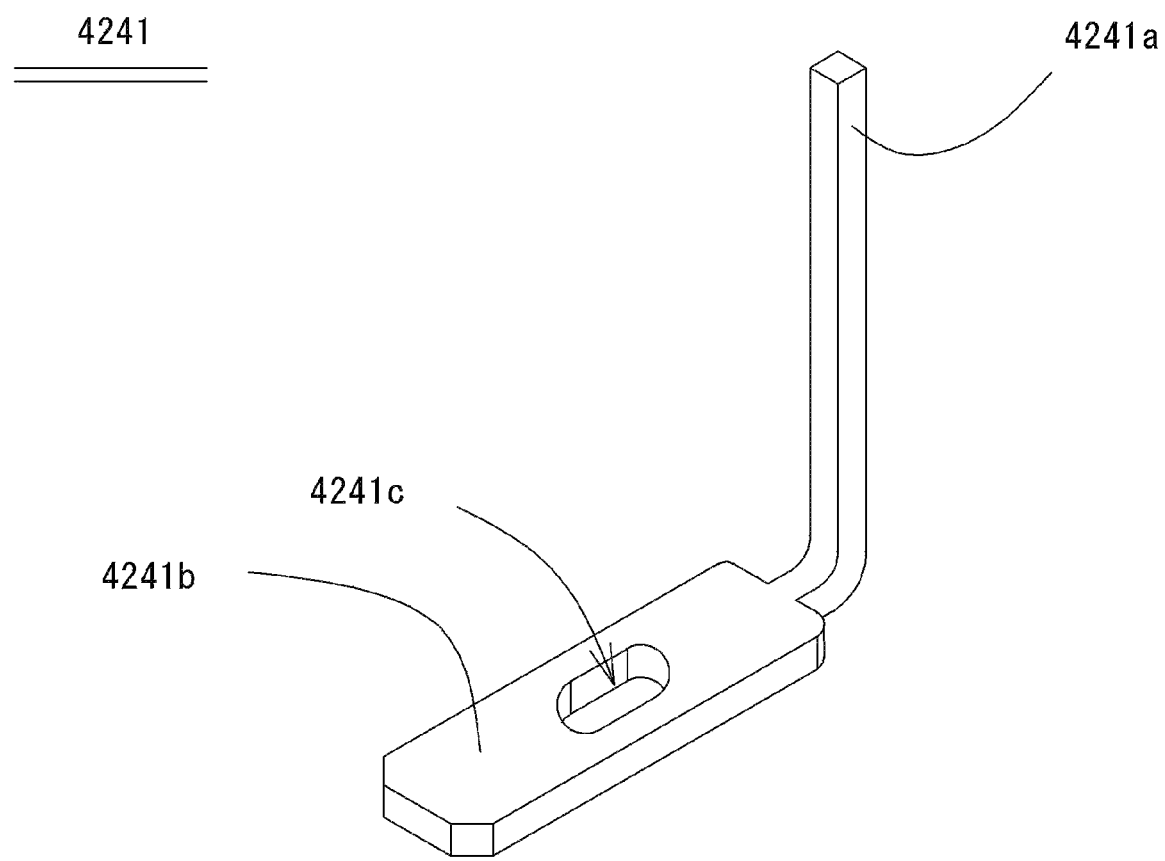
FIG. 5 is a perspective view of a terminal of the resolver of FIGS. 2 and 3.

Referring to FIG. 5, there is described in detail a structure of the terminal 4241 in this preferred embodiment. FIG. 5 is a perspective view of the terminal in this preferred embodiment.

Referring to FIG. 5, the terminal 4241 includes a conductive wire connecting portion 4241a having a substantially L-shape in cross section and projecting axially upwards from the upper surface of the terminal block 424 to be connected to the conductive wire 4231, and a lead wire connecting portion 4241b projecting radially outwards from a radial end of the terminal block 424 to be connected to the lead wire 43.

The conductive wire connecting portion 4241a has a substantially square column shape of a small wire diameter as the conductive wire 4231 is wound therearound for a plurality of times and is fixed by TIG welding or the like. However, the conductive wire connecting portion 4241a is not limited to have the substantially square column shape, but may have a substantially column shape or other suitable shape.

The lead wire connecting portion 4241b preferably has a flat plate shape of a circumferential width larger than that of the conductive wire connecting portion 4241a and larger than a wire diameter of the conductor 431 in the lead wire 43. The lead wire connecting portion 4241b is formed with a through hole 4241c for allowing the connecting end 4313 of the lead wire 43 to be inserted thereinto. The through hole 4241c axially penetrates through the lead wire connecting portion 4241b. The through hole 4241c is elongated in a longitudinal direction of the lead wire connecting portion 4241b (indicated with an arrow X in the drawing).

Detailed Structure of Terminal Block

Figure 6:
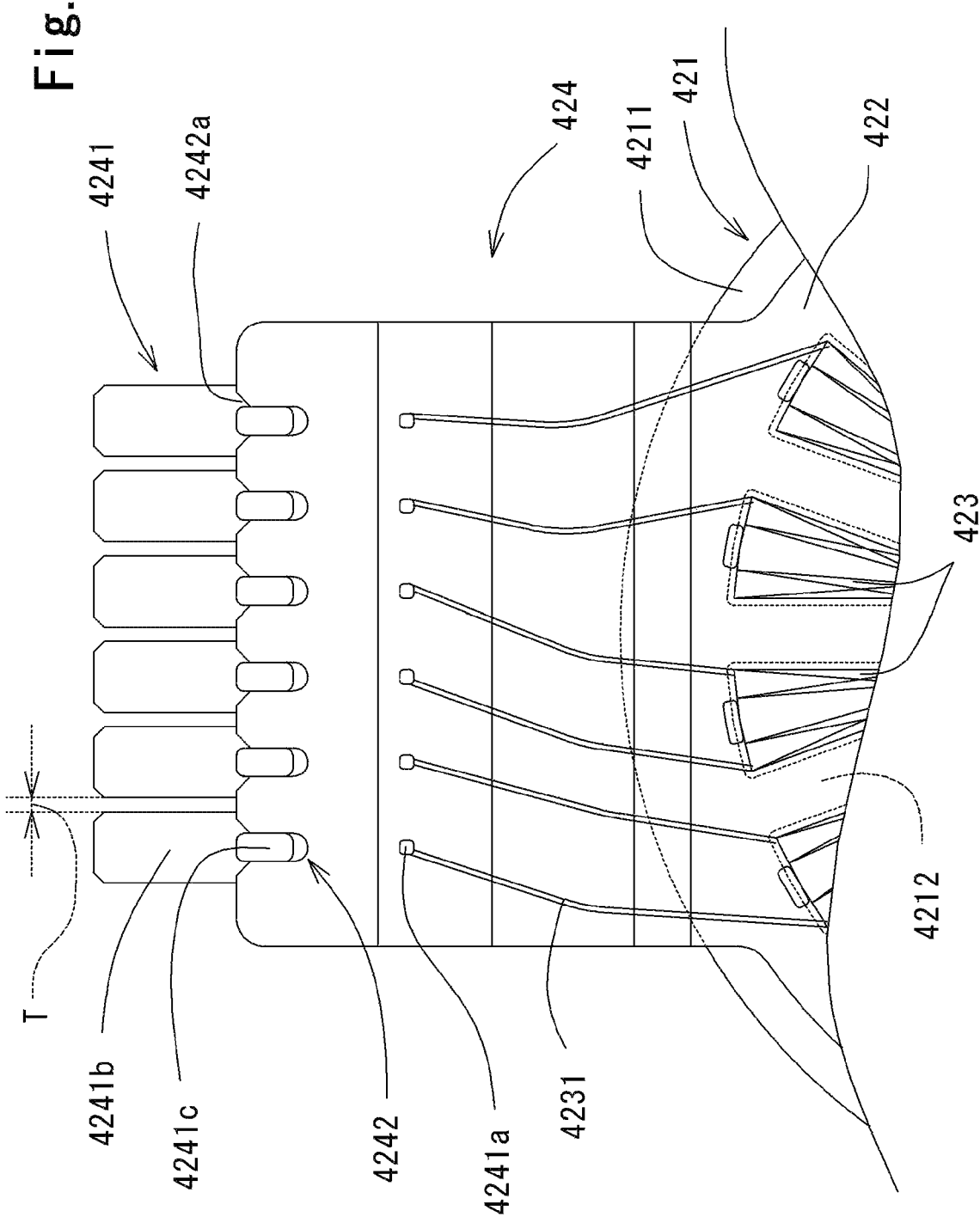
FIG. 6 is an enlarged view of a terminal block of the resorver of FIGS. 2 and 3.
Figure 7:
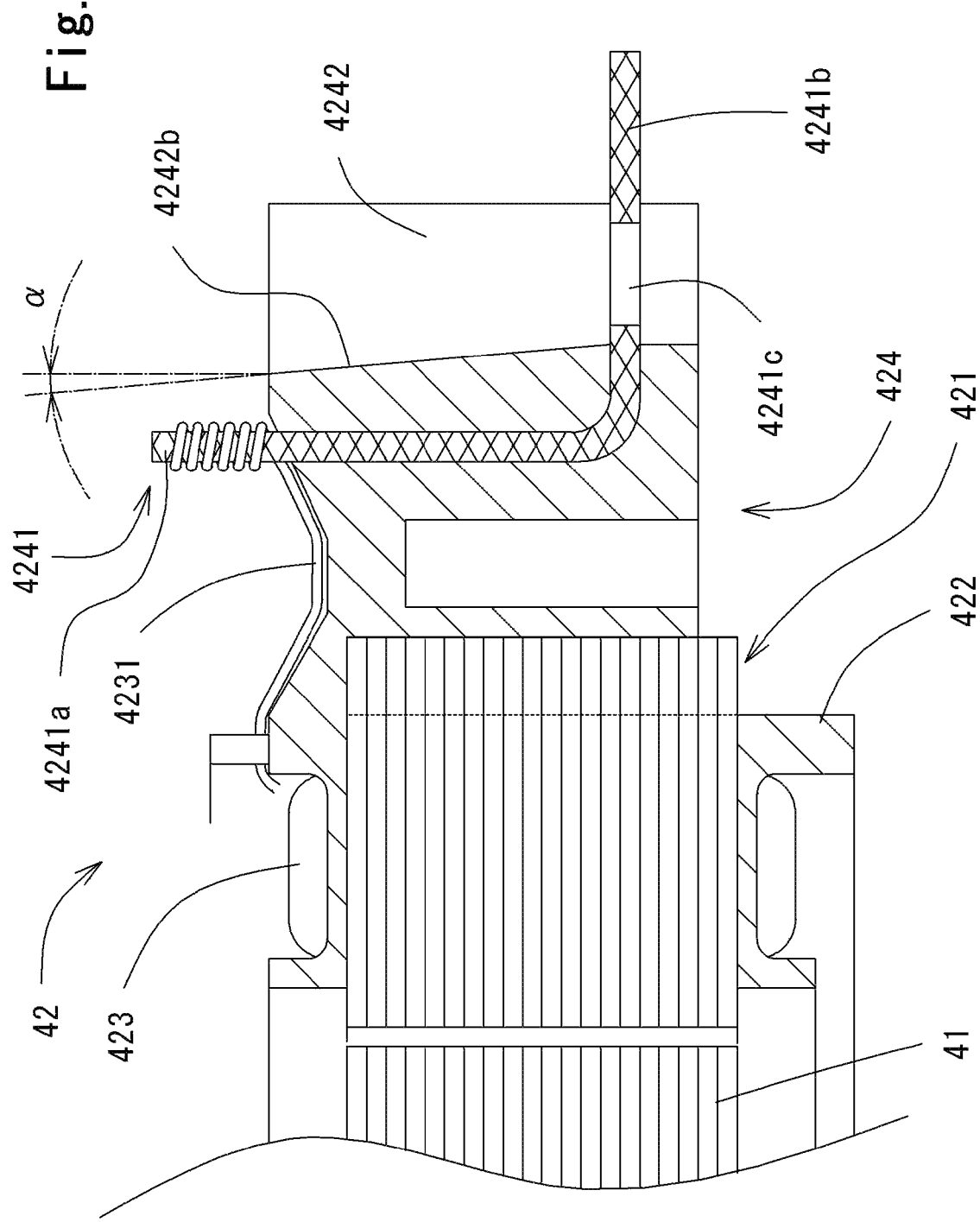
FIG. 7 is another enlarged view of the terminal block.
Figure 8:
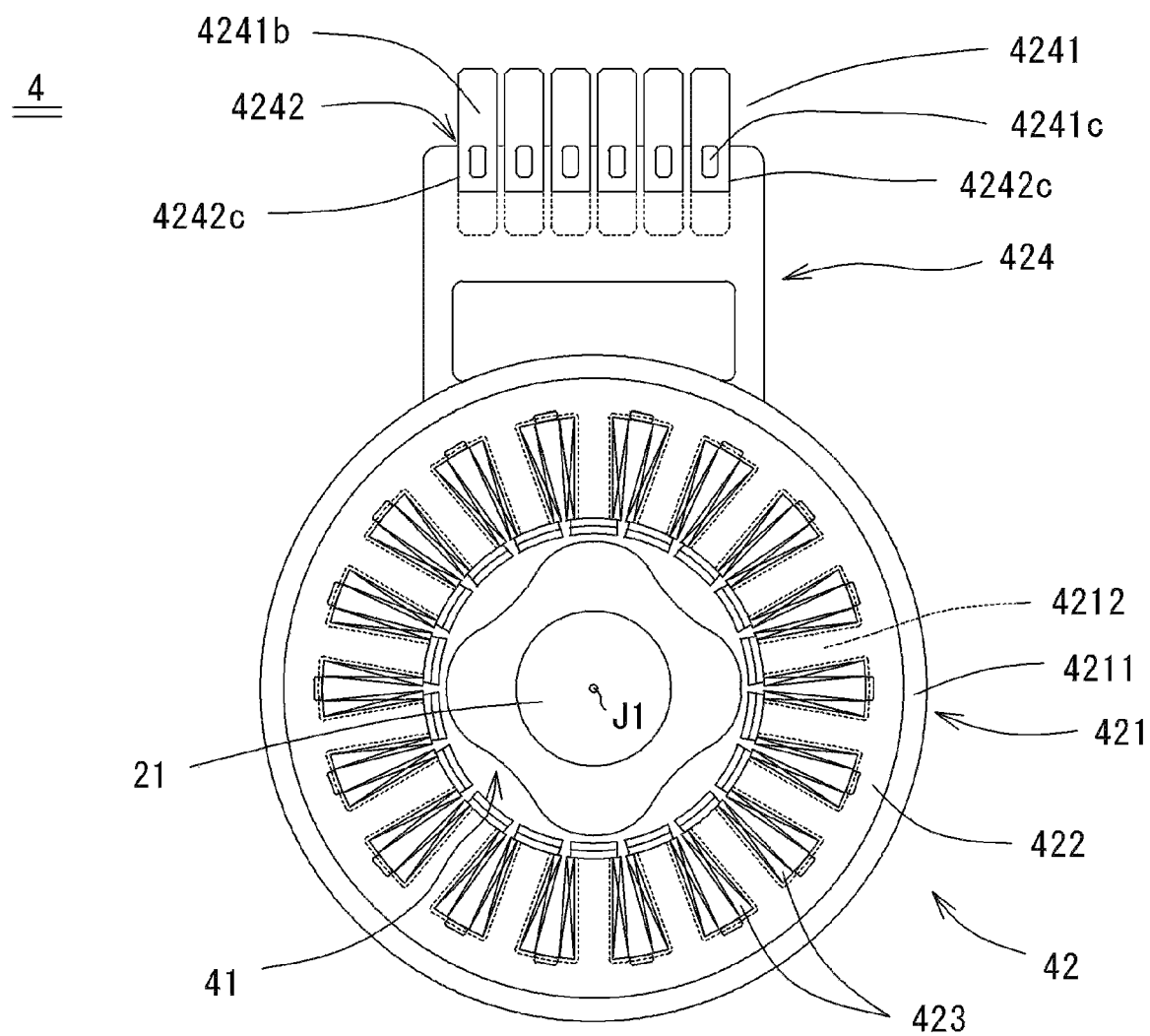
FIG. 8 is a plan view of the terminal block, when viewed from below.

Referring to FIGS. 6 to 8, there is described in detail a structure of the terminal block 424. FIG. 6 is an enlarged plan view of the terminal block 424. FIG. 7 is an enlarged cross-sectional view of the terminal block 424 cut along the axial direction. FIG. 8 is a plan view of the terminal block 424 seen from below.

Referring to FIG. 6, the terminal block 424 is formed, at the radial end thereof, with insertion through portions 4242 for allowing the lead wires 43 (not shown in FIG. 6) to be respectively inserted thereinto from a substantially axial direction. Each of the insertion through portions 4242 is formed to axially penetrate the terminal block 424. Particularly in this preferred embodiment, each of the insertion through portions 4242 has an opened portion 4242a opened radially outwards. The opened portion 4242a is preferably formed to have a circumferential width equal to or smaller than the wire diameter of the conductor 431 in the lead wire 43 to be inserted into the insertion through portion 4242. The through holes 4241c are located respectively at positions where the plurality of terminals 4241 are axially overlapped with the insertion through portions 4242.

With this structure, the conductor 431 inserted respectively into the insertion through portion 4242 can be guided to the lead wire connecting portion 4241*b* of the terminal 4241 without radially sticking out from the opened portion 4242*a*. Therefore, the conductor 431 can be easily positioned radially with respect to the lead wire connecting portion 4241*b*. In addition, since the through hole 4241*c* is formed as an elongated hole, the connecting end 4313 (not shown in FIG. 6) of the conductor 431 can be easily inserted into the through hole 4241*c* even when the connecting end 4313 is somewhat deformed. Therefore, the conductor 431 and the lead wire connecting portion 4241*b* can be easily connected to each other.

The lead wire connecting portions 4241*b* preferably are circumferentially spaced apart from one another by a minute space T (which is not more than about 1 mm in this preferred embodiment, for example). Each of the lead wire connecting portions 4241*b* has a circumferential width substantially equal to or slightly larger than the wire diameter of the connected conductor 431. Therefore, the lead wire connecting portion 4241*b* and the connecting end 4313 of the conductor 431 can be easily fixed to each other. If the circumferential space between the adjacent lead wire connecting portions 4241*b* is large, the terminal block 424 is made circumferentially large, resulting in an increased size of the resolver 4. However, since the adjacent lead wire connecting portions 4241*b* are disposed with a minute space therebetween, the terminal block 424 can be reduced in circumferential size to realize the resolver 4 of a small size.

Referring to FIG. 7, the insertion through portion 4242 on the terminal block 424 is formed, at a radially inner side thereof, with an inclined surface 4242*b* axially inclined by an angle α into a radially inner side toward the conductive wire connecting portion 4241*a* where the conductive wire 4231 is connected thereto (that is, to the resolver stator core 421 side when seen from the insertion through portion 4242 in the extending direction of the terminal block 424). The inclined angle of the inclined surface 4242*b* may be about a draft angle in formation. Each of the conductors 431 in the lead wire 43 can be guided by the inclined surface 4242*b* to the through hole 4241*c* at the lead wire connecting portion 4241*b*. With this configuration, the conductors 431 can be easily inserted respectively into the corresponding insertion through portions 4242. In addition, since the through hole 4241*c* is formed as the elongated hole, the connecting end 4313 of the lead wire 43 can be inserted into the through hole 4241*c* while being inclined by a predetermined angle. It is possible to set more freely the inserted position of the connecting end 4313 into the through hole 4241*c*.

Referring to FIG. 8, there is formed an enlarged insertion through portion 4242*c* at a lower portion of each of the insertion through portions 4242 on the terminal block 424 such that the enlarged insertion through portion 4242*c* has a circumferential width larger than that of an upper part of the insertion through portion 4242. A radially inner side of the lead wire connecting portion 4241*b* is partially fixed to the enlarged insertion through portion 4242*c*. The enlarged insertion through portion 4242*c* is formed integrally with the terminal block 424 such that the lead wire connecting portion 4241*b* has a circumferential width larger than that of the enlarged insertion through portion 4242*c*. With this configuration, since the lead wire connecting portion 4241*b* is axially held by the insertion through portion 4242 and the enlarged insertion through portion 4242*c* on the terminal block 424, it is possible to prevent the terminal 4241 from being disconnected from the terminal block 424. As a result, there is provided a resolver of a high degree of accuracy. It is noted that the enlarged insertion through portion 4242*c* has the circumferential width larger than the wire diameter of the conductor 431.

Method of Connecting Lead Wire and Terminal to Each Other

Figure 9:
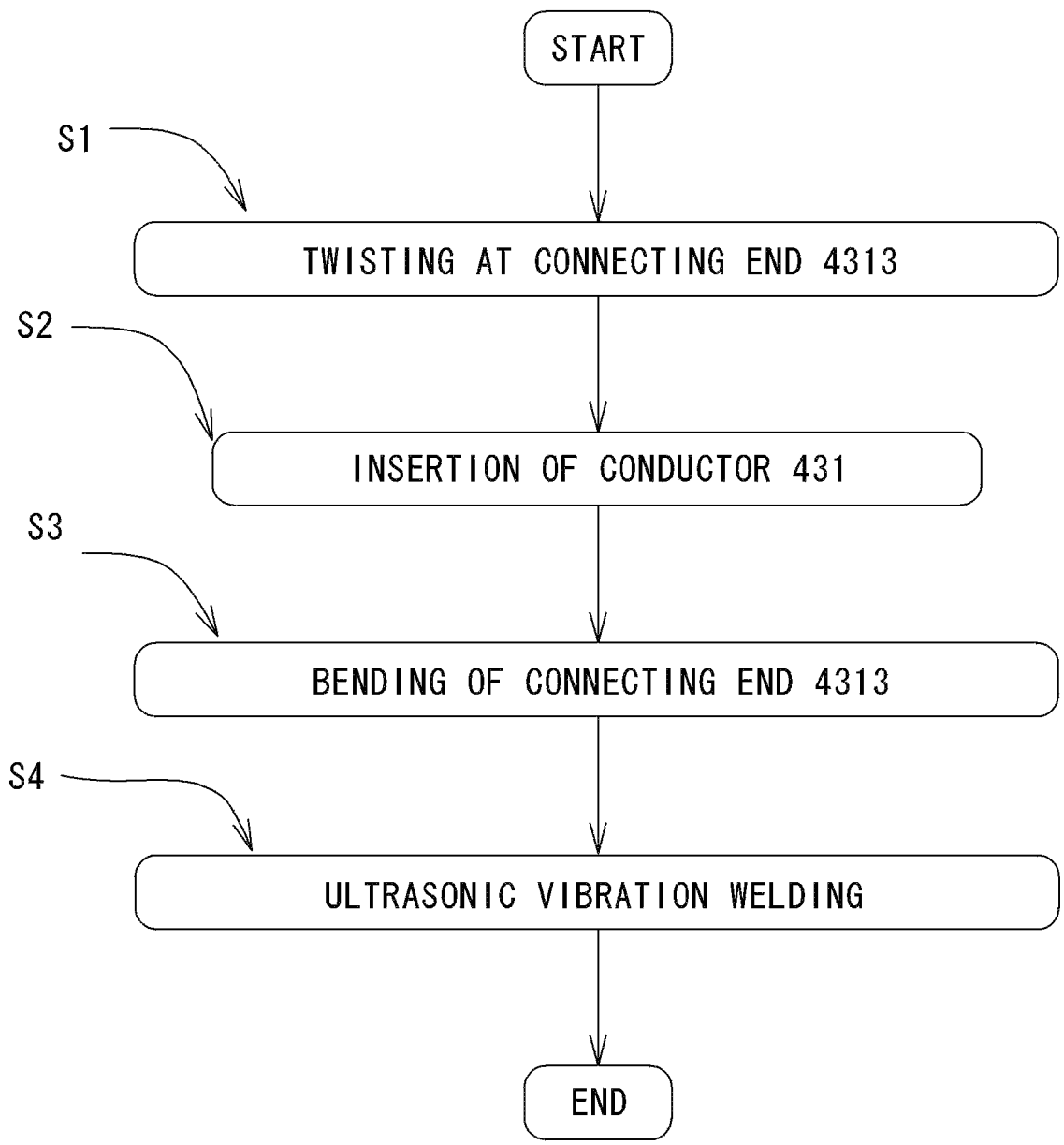
FIG. 9 shows a procedure for connecting the lead wire and the terminal to each other according to a preferred embodiment of the present invention.

Referring to FIGS. 9 to 13, the steps of connecting the lead wire 43 and the terminal 4241 to each other are described. FIG. 9 is a flowchart of a procedure for connecting the conductor 431 in the lead wire 43 and the terminal 4241 to each other. FIGS. 10, 11, 12, and 13 show Steps S1, S2, S3, and S4 of FIG. 9, respectively.

Figure 10:
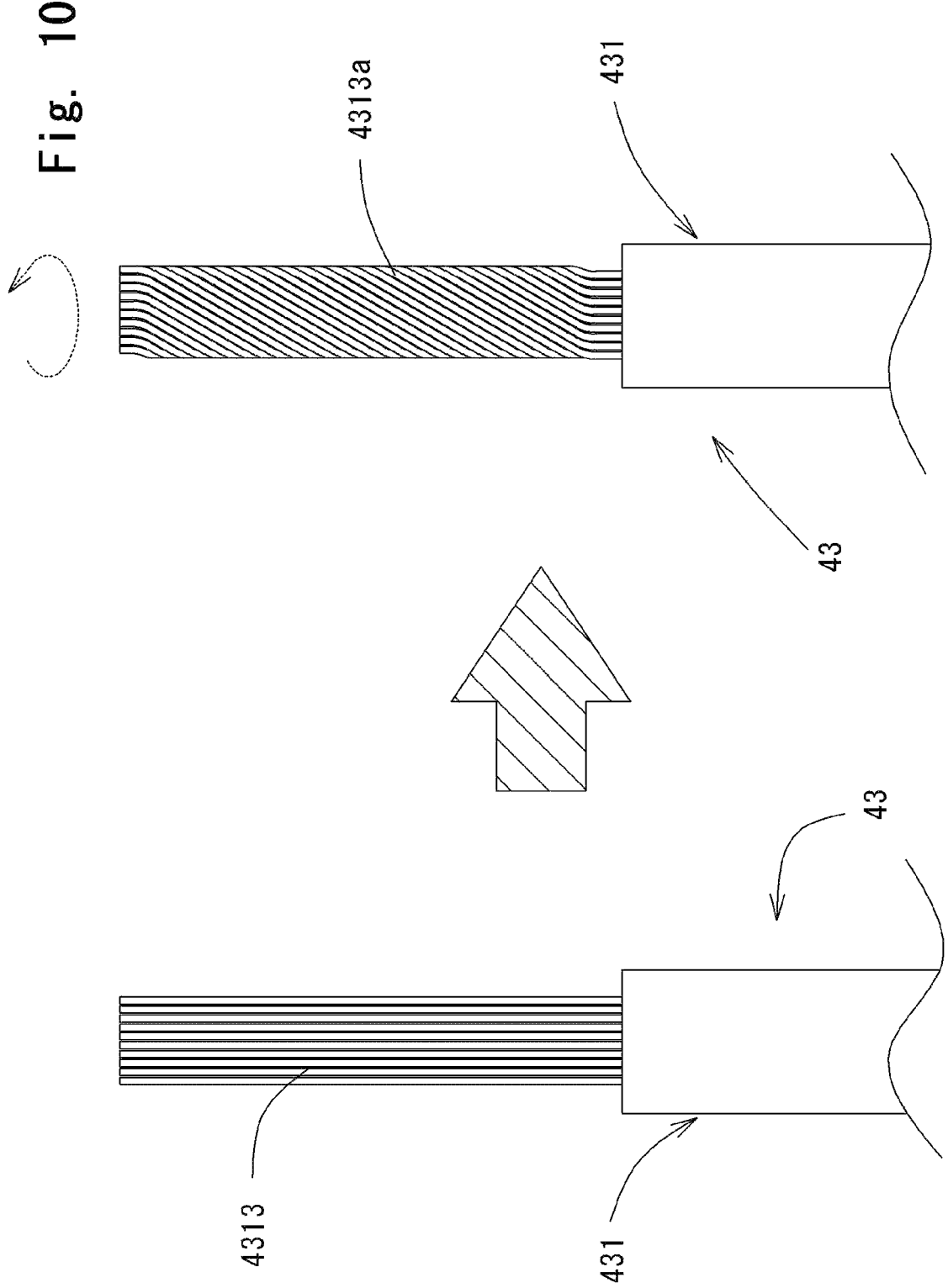
FIG. 10 illustrates Step S1 of FIG. 9.

Referring to FIG. 10, at the connecting end 4313 of each of the conductors 431 in the lead wire 43, the plurality of copper wires 4311 are bundled together so as not to be feazed and are twisted in a predetermined direction (as indicated with a dashed arrow in FIG. 10) (Step S1 in FIG. 9). The connecting end 4313 is then provided with a twisted portion 4313*a* formed by twisting collectively the plurality of copper wires 4311.

Figure 11:
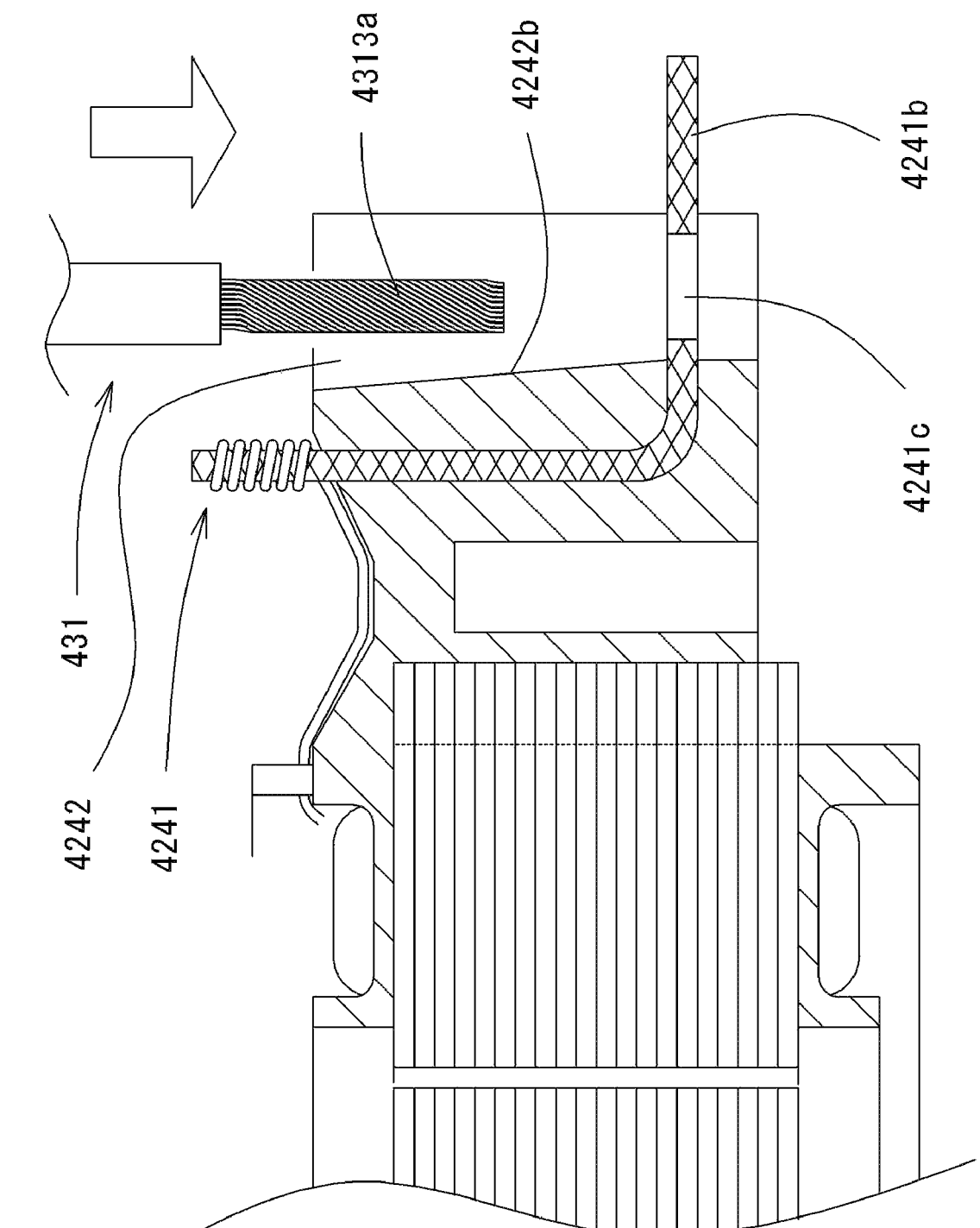
FIG. 11 illustrates Step S2 of FIG. 9.

Referring to FIG. 11, each of the conductors 431 is inserted from above into the corresponding insertion through portion 4242 on the terminal block 424 along a substantially axial direction (step S2 in FIG. 9). Since the inclined surface 4242*b* is formed on the radially inner side of the insertion through portion 4242, each of the conductors 431 can be easily inserted. Referring to FIG. 6, since each of the opened portions 4242*a*, which are provided to be circumferentially adjacent to one another, is made to have a circumferential width equal to or smaller than the wire diameter of the conductor 431, the inserted conductor 431 does not radially stick out from the opened portion 4242*a* and it is possible to restrict radial and circumferential displacement of the conductor 431.

Figure 12:
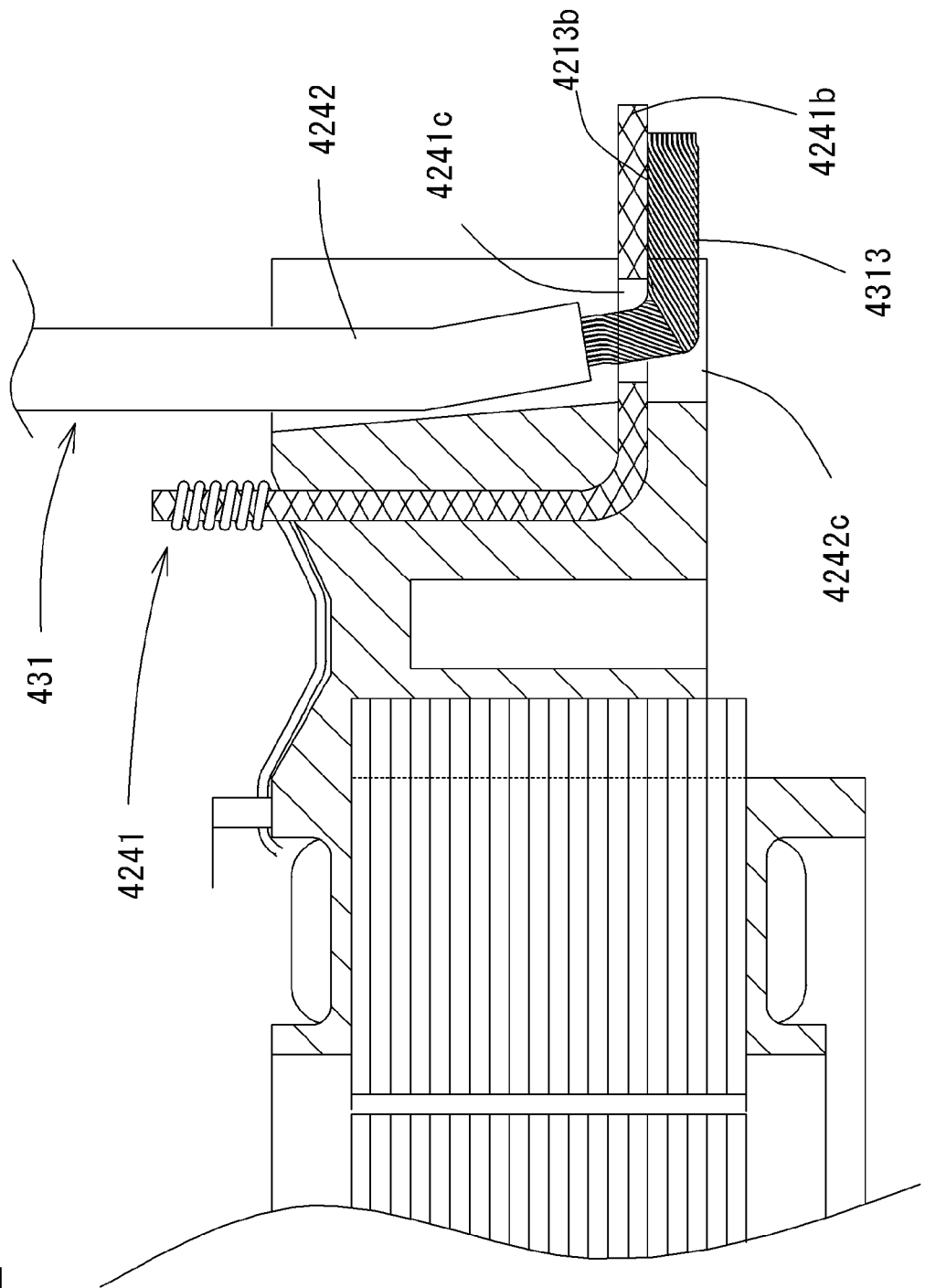
FIG. 12 illustrates Step S3 of FIG. 9.

Referring to FIG. 12, the connecting end 4313 of each of the conductors 431 is inserted into the through hole 4241*c* formed at the lead wire connecting portion 4241*b*. The connecting end 4313 projecting downwards from the lead wire connecting portion 4241*b* is bent radially outwards (Step S3 in FIG. 9). Since the connecting end 4313 of each of the conductors 431 is previously twisted to be bundled together, the plurality of copper wires 4311 forming the each conductor 431 are not feazed to make the connecting end 4313 larger than the circumferential width of the through hole 4241*c*. Therefore, the connecting end 4313 can be easily inserted into the through hole 4241*c*. Referring to FIG. 8, since the enlarged insertion through portion 4242*c* is formed at the lower portion of the insertion through portion 4242, a work space is enlarged for bending the connecting end 4313 projecting downwards from the lead wire connecting portion 4241*b*, thereby easing the bending operation.

Figure 13:
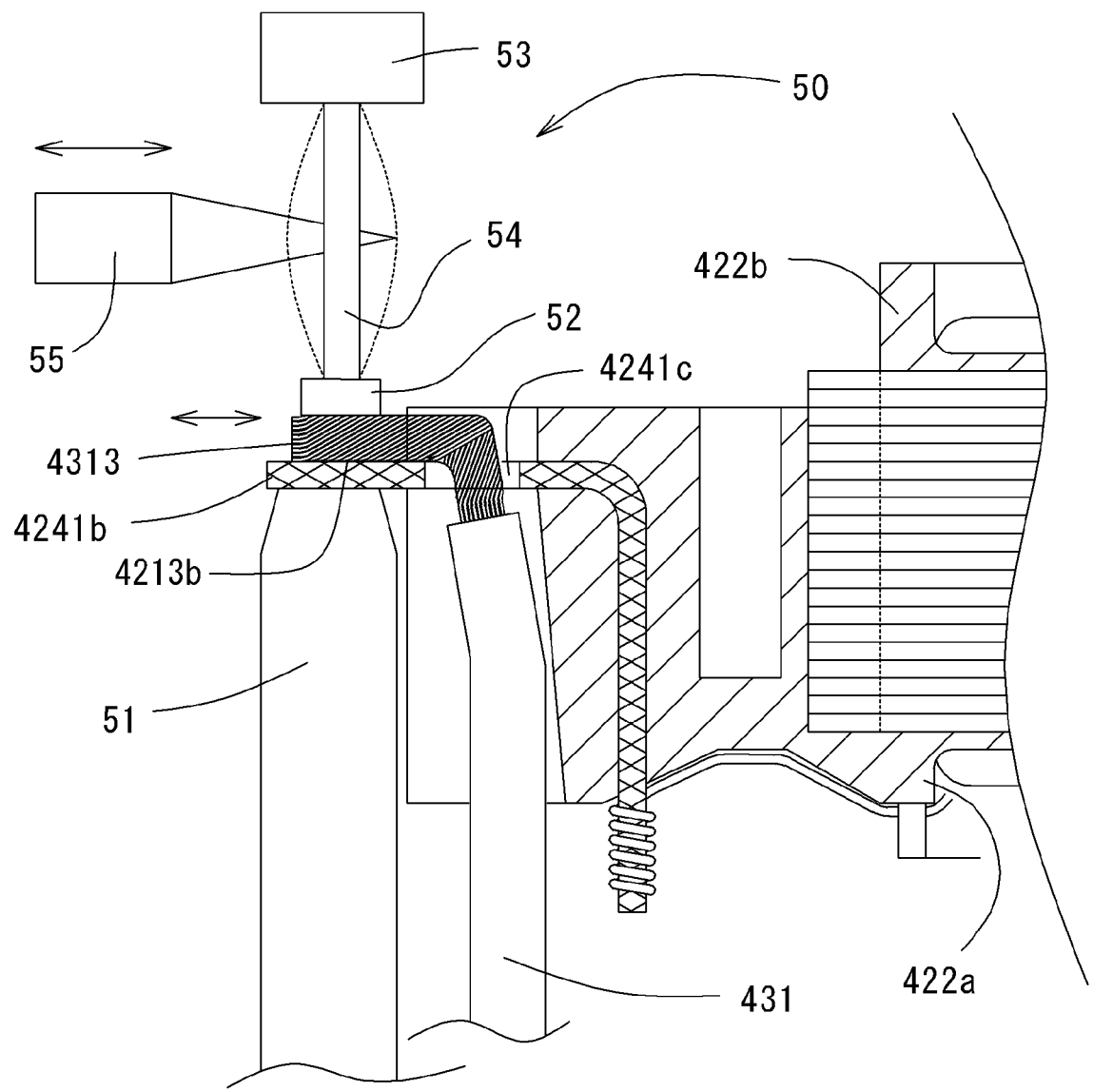
FIG. 13 illustrates Step S4 of FIG. 9.

Referring to FIG. 13, the connecting end 4313 and the lead wire connecting portion 4241*b* are welded together by ultrasonic welding (Step S4 in FIG. 9), for example.

Figure 14:
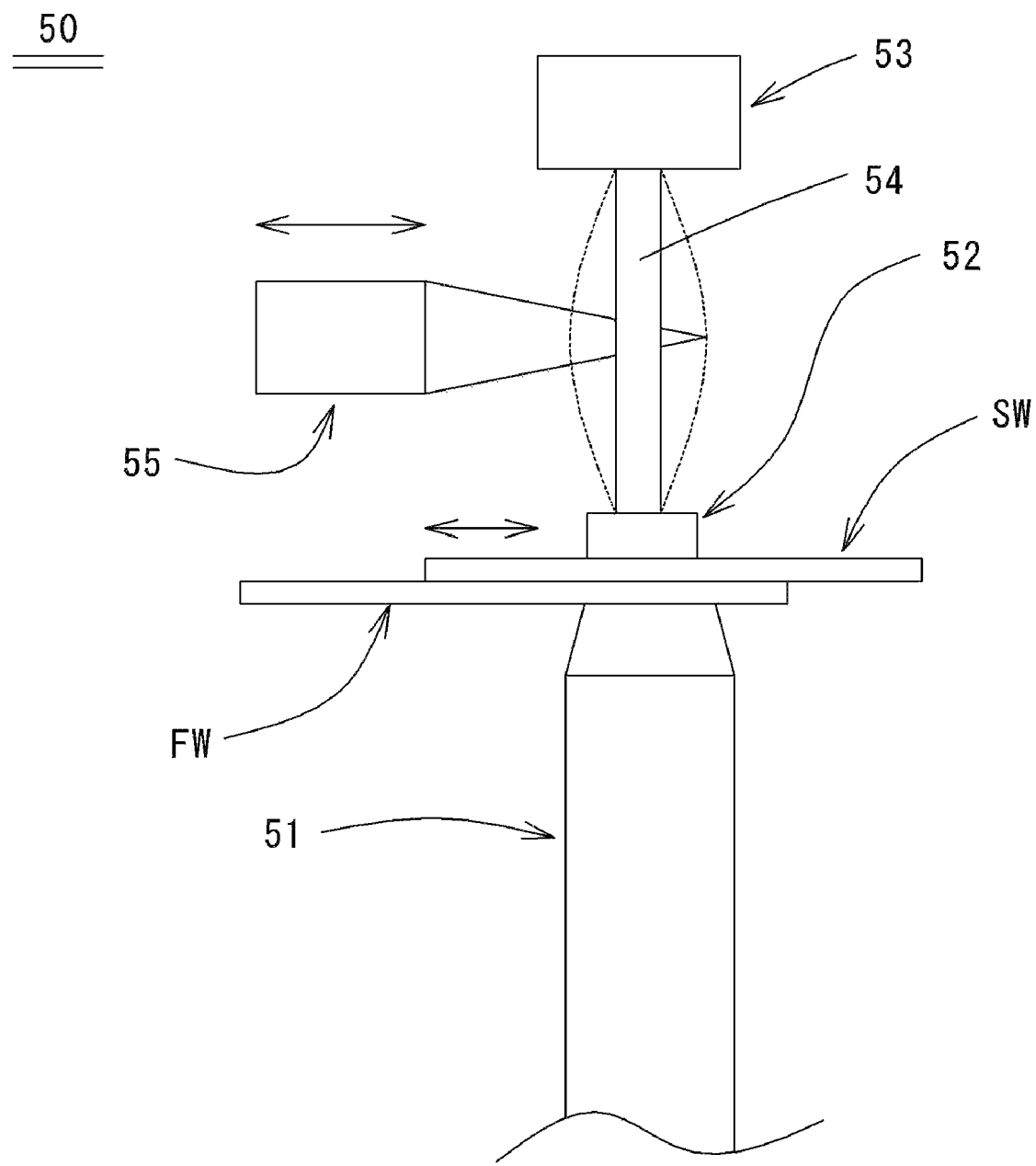
FIG. 14 shows a portion of an exemplary welding machine.

Referring to FIG. 14, there is provided description on a general structure of an ultrasonic welding machine. FIG. 14 shows an exemplary ultrasonic welding machine 50. In FIG. 14, the axial direction is indicated with dashed lines J1.

Referring to FIG. 14, the welding machine 50 includes an anvil 51 which supports a first work FW (the lead wire connecting portion 4241*b* in this preferred embodiment), a chip 52 to be in contact with a second work SW (the connecting end 4313 in this preferred embodiment) while facing the anvil 51 with the first work FW interposed therebetween, a pressurizing portion 53 which pressurizes the chip 52, a vibration transferring portion 54 which transfers vibration to the chip 52 by connecting the chip 52 and the pressurizing portion 53, and a transducer 55 in contact with the vibration transferring portion 54 to serve as a vibration generator. When performing welding with the welding machine 50, the second work SW is vibrated with respect to the first work FW due to vibration transferred from the transducer 55 through the vibration transferring portion 54 to the chip 52. Frictional heat generated due to contact between the first work FW and the second work SW melts a contact surface between the first work FW and the second work SW.

Referring again to FIG. 13, the connecting end 4313 and the lead wire connecting portion 4241b are sandwiched between the anvil 51 and the chip 52 from both the axial directions while the connecting end 4313 and the lead wire connecting portion 4241b being in contact with each other.

In order to join the connecting end 4313 and the lead wire connecting portion 4241b, the transducer 55 radially vibrates to transfer generated vibration to the vibration transferring portion 54, so that the chip 52 and the connecting end 4313 in contact with the chip 52 are vibrated. It is noted that, since the lead wire connecting portion 4241b is supported by the anvil 51, displacement thereof is restricted. The connecting end 4313 is then vibrated with respect to the lead wire connecting portion 4241b with the chip 52 interposed therebetween. Frictional heat generated due to such vibration melts a contact surface between the connecting end 4313 and the lead wire connecting portion 4241b to join to each other (the contact surface between the connecting end 4313 and the lead wire connecting portion 4241b to be melted with each other is referred to as a melting portion 4213b). In ultrasonic welding, as the connecting end 4313 and the lead wire connecting portion 4241b are joined to each other due to frictional heat generated therebetween, there is required no additional member (such as a solder) for joining, resulting in that there is required a less space for such joining. In conventional soldering, a space for the solder between the adjacent connecting ends 4313 has been required. In contrast, such a space is not required in ultrasonic welding since no member such as the solder for covering (joining) the connecting end 4313 and the lead wire connecting portion 4241b is required.

In addition to soldering, there is another joining method, such as TIG welding, of flowing an electric current through a welding electrode to join a portion to be joined with the melted welding electrode. However, when TIG welding is carried out in this preferred embodiment, in a case where the plurality of copper wires 4311 at the connecting end 4313 of the each conductor 431 in the lead wire 43 are partially deformed so as to extend radially outwards, the electric current flows mainly to the deformed portion. The welding electrode is not melted at an entire contact portion between the connecting end 4313 and the lead wire connecting portion 4241b and therefore joining cannot be uniformly performed. In particular, in a case where even one of the plurality of copper wires 4311 is deformed toward an arc (not shown) serving as an electric current generator for TIG welding, the flow of the electric current is concentrated to the one copper wire. Therefore, TIG welding is not suitable for a case of joining by simultaneously bringing a plurality of members into contact, such as the plurality of copper wires 4311.

In comparison with the above-described TIG welding, when ultrasonic welding is applied to join the connecting end 4313 and the lead wire connecting portion 4241b, joining is performed in a state where all the plurality of copper wires 4311 at the connecting end 4313 are sandwiched between the chip 52 and the lead wire connecting portion 4241b, so that the entire contact portion between the connecting end 4313 and the lead wire connecting portion 4241b can be uniformly joined. In particular, even in a case where the plurality of copper wires 4311 are partially deformed so as to extend radially outwards, the deformed portion of the copper wires 4311 come into contact with the chip 52 to be forcedly directed and fixed to the lead wire connecting portion 4241b. Thus, it is possible to increase reliability of the joint between the connecting end 4313 and the lead wire connecting portion 4241b. As a result, there is provided a resolver of high reliability.

Since the plurality of copper wires 4311 at the connecting end 4313 of the each conductor 431 are bundled together and twisted, it is possible to prevent the plurality of copper wires 4311 from spreading individually even when the copper wires 4311 are pressurized by and brought into contact with the chip 52. Accordingly, even in a case where the circumferentially adjacent connecting ends 4313 are brought closer to each other, the plurality of copper wires 4311 belonging to the adjacent connecting ends 4313 can be prevented from being brought into contact with each other. The connecting ends 4313 can be therefore brought closer to each other to realize reduction in size of the terminal block 424.

Arrangement of Resolver

Figure 15:
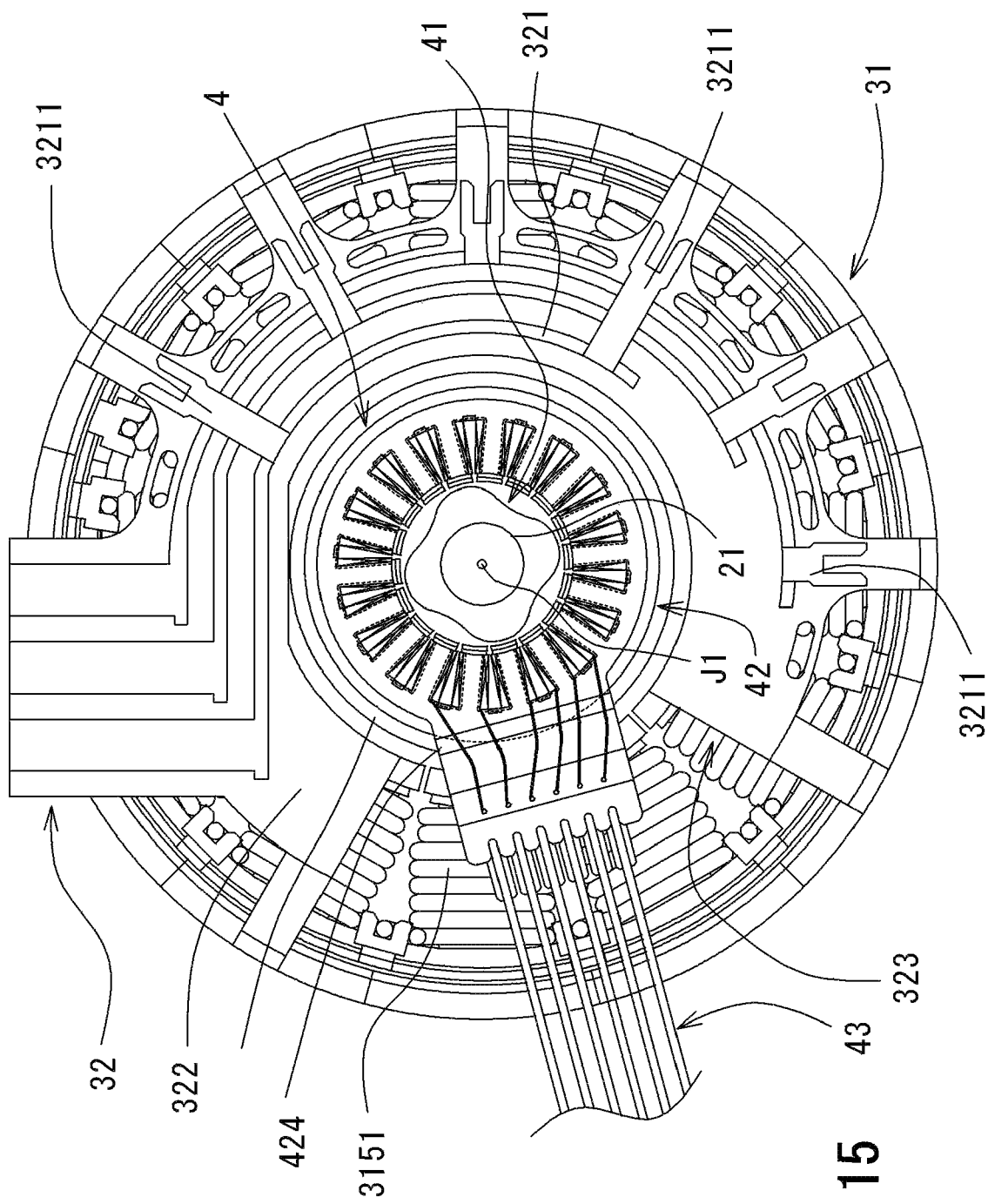
FIG. 15 shows a layout of the resolver seen from above, which is accommodated in the motor according to a preferred embodiment of the present invention.

Referring to FIGS. 1 and 15, described below is an axial and radial arrangement of the resolver 4 in the motor 1. FIG. 15 is a plan view of the resolver 4 and a periphery thereof, which is mounted in the motor 1.

Referring to FIG. 1, in the resolver 4, the resolver stator 42 is disposed on an inner peripheral side of the bus bar unit 32 while being radially overlapped with the bus bar unit 32. Accordingly, the motor 1 can be reduced in axial length so as to realize a smaller motor.

Referring to FIG. 15, the terminal block 424 of the resolver 4 is disposed to project from a cutout portion 323 of the bus bar unit 32. The terminal block 424 provided to the resolver 4 can be disposed on the inner peripheral side of the bus bar unit 32 due to existence of the cutout portion 323 formed on the bus bar unit 32. Since the terminal block 424 of the resolver 4 can be reduced in size, the cutout portion 323 of the bus bar unit 32 can be reduced in circumferential width. Accordingly, it is possible to increase a width of a substantially circular arc shape of the bus bar unit 32. As a result, it is possible to increase the circumferential space between the adjacent terminals 3211 extending radially outwards from the plurality of switchboards 321. When the circumferential space between the adjacent terminals 3211 is increased, it is possible to easily join the coil wire 3141 and the terminal 3211.

Figure 16:
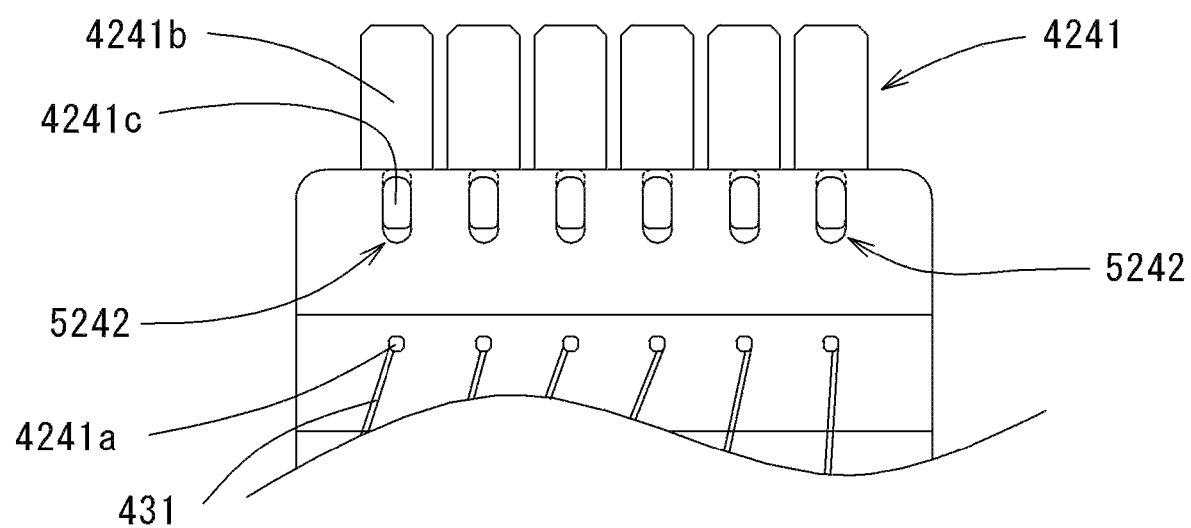
FIG. 16 is an enlarged plan view of an insertion through portion and a periphery thereof according to another preferred embodiment of the present invention, when viewed from above.
Figure 17:
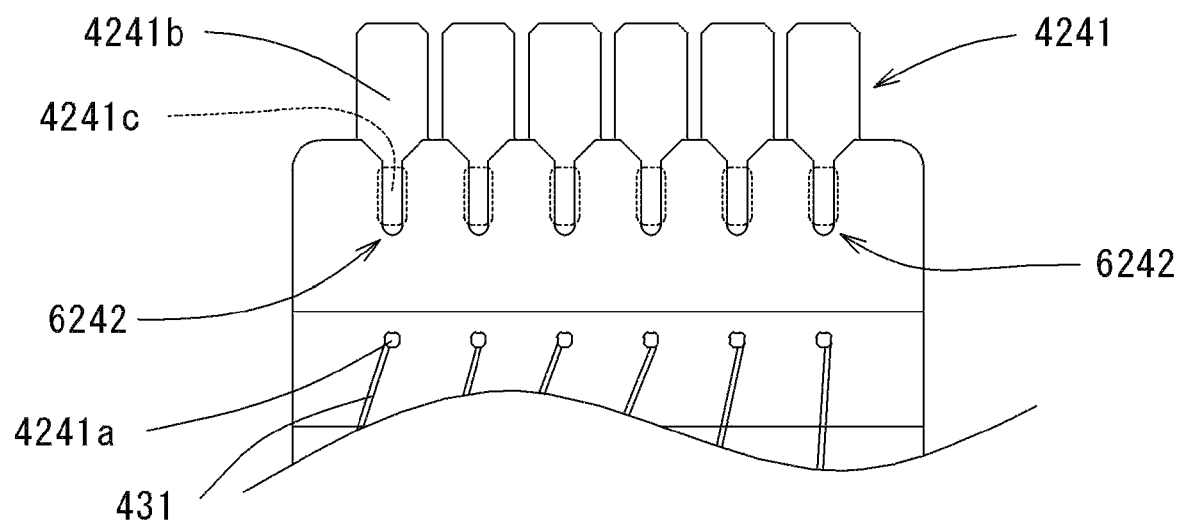
FIG. 17 is an enlarged plan view of an insertion through portion and a periphery thereof according to still another preferred embodiment of the present invention, when viewed from above.
Figure 18:
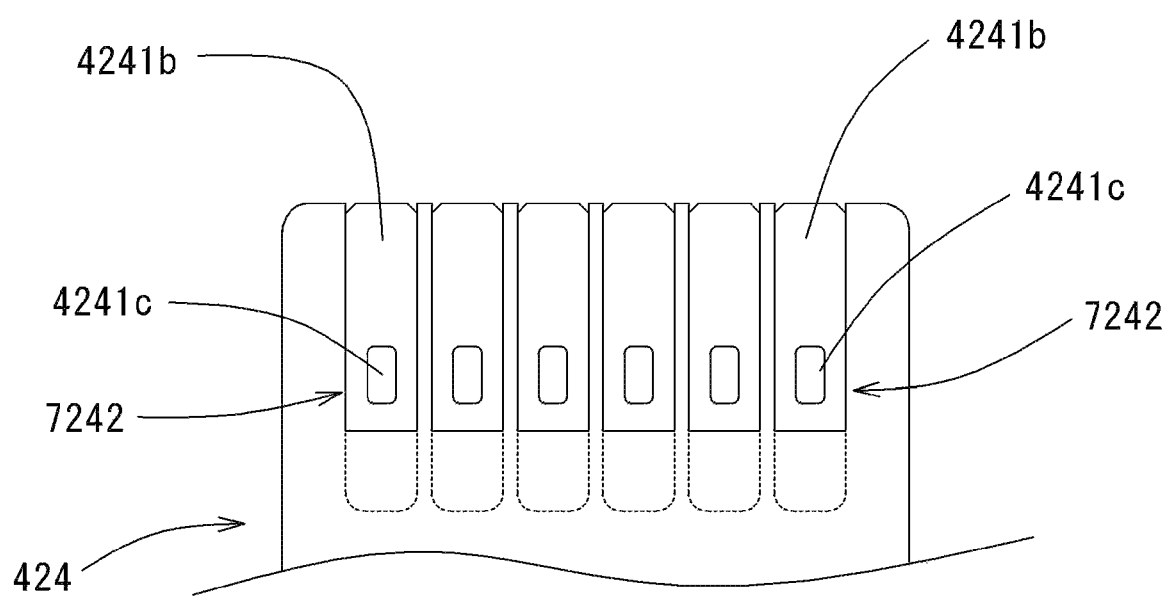
FIG. 18 is an enlarged plan view of an insertion through portion and a periphery thereof according to still further another preferred embodiment of the present invention, when viewed from below.
Figure 19:
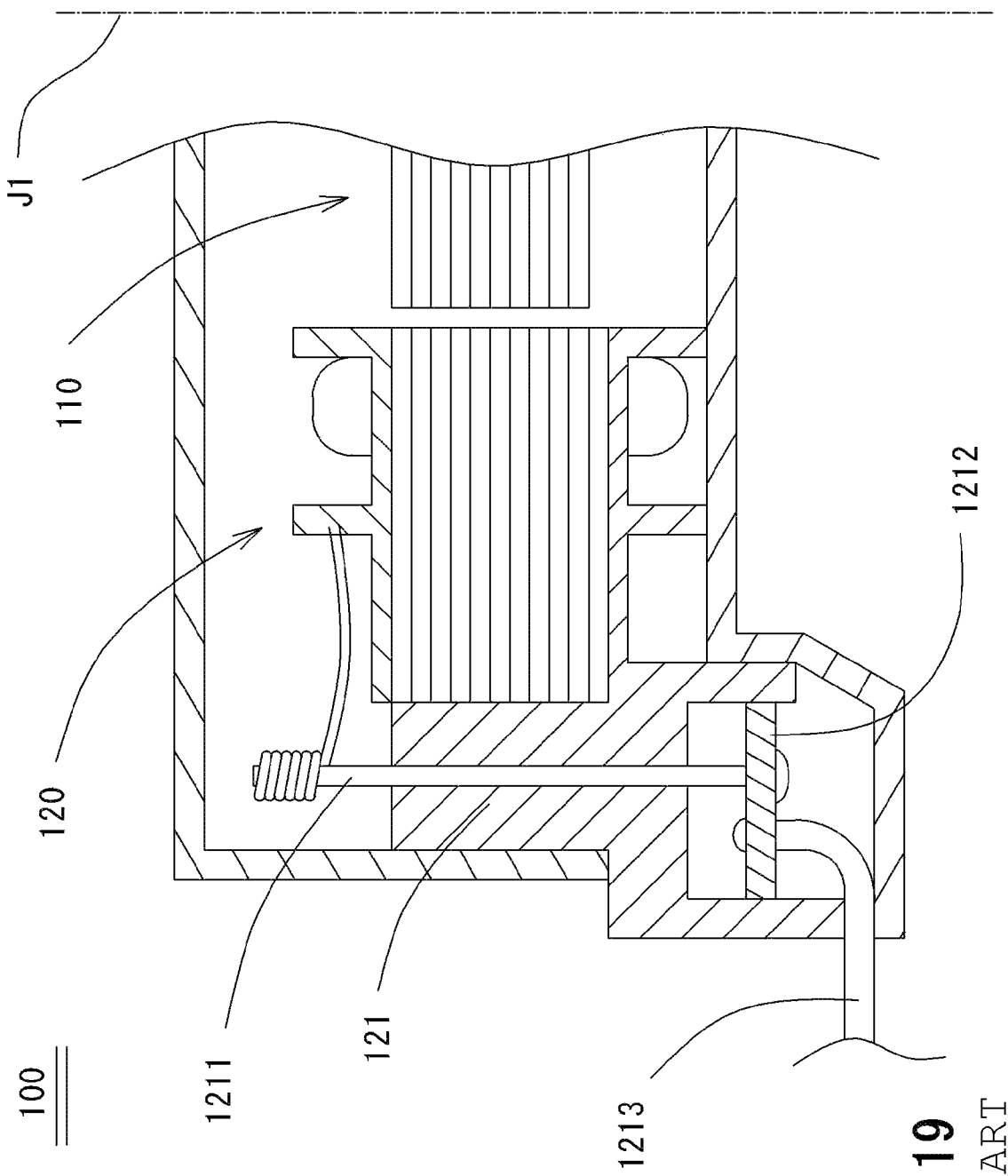
FIG. 19 is a cross-sectional view of a portion of an exemplary conventional resolver.
Figure 20:
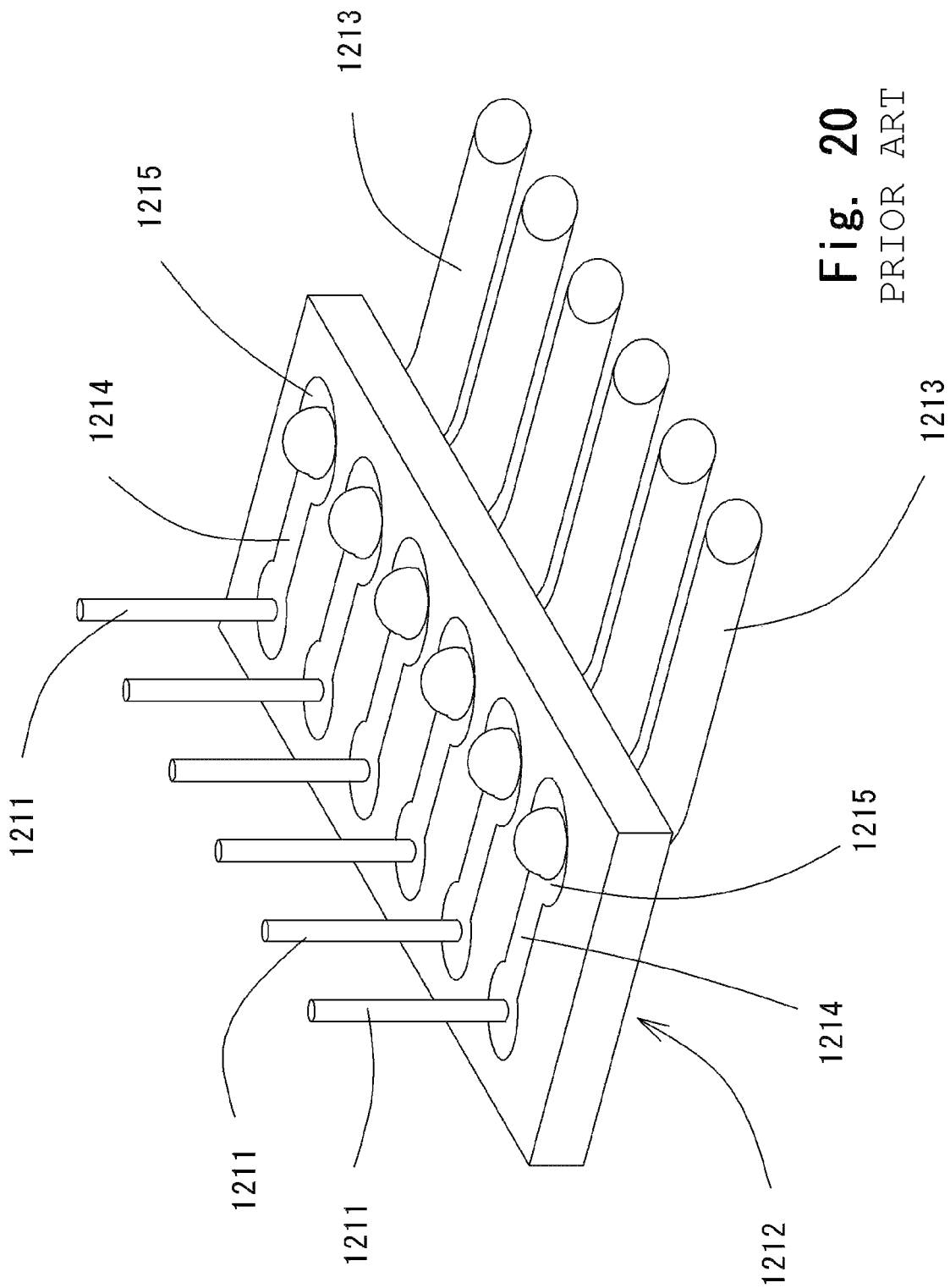
FIG. 20 shows a portion of a terminal block of the resolver in FIG. 19 in order to show a structure connecting lead wires and the terminal block to each other.

Insertion Through Portions and Periphery Thereof According to Other Preferred Embodiments Referring to FIGS. 16 to 18, described below are insertion through portions formed on the terminal block of the resolver according to other preferred embodiments of the present invention. In each of these preferred embodiments, portions other than the insertion through portion are preferably identical to those of the above-described embodiment, so that those portions are designated using symbols identical to those of the above description. Each of FIGS. 16 and 17 is an enlarged top view of an insertion through portion and a periphery thereof on the terminal block. In FIGS. 16 and 17, dashed line indicates the through hole 4241c. FIG. 18 is an enlarged view of an insertion through portion and a periphery thereof on the terminal block, when viewed from below.

Referring to FIG. 6, an insertion through portion 5242 is formed as an opening with no cutout on a radially outer side thereof. The insertion through portion 5242 is formed with an inclined surface such that an inner diameter of the opening is decreased toward the lead wire connecting portion 4241b.

The inner diameter of the insertion through portion 5242 at a position where the insertion through portion 5242 is in contact with an upper surface of the lead wire connecting portion 4241b is preferably substantially identical to at least the circumferential width of the through hole 4241c. With this configuration, the connecting end 4313 of the lead wire 43 can be easily guided into the through hole 4241c. Therefore, the lead wire 43 can be easily and reliably inserted through the insertion through portion 5242.

Referring to FIG. 17, an insertion through portion 6242 is preferably formed to have a circumferential width that is approximately the same size or smaller than the circumferential width of the through hole 4241c at the lead wire connecting portion 4241b, and larger than the wire diameter of the lead wire 43. It is therefore possible to prevent the connecting end 4313 of the lead wire 43 from being brought into contact with a peripheral edge of the through hole 4241c. Accordingly, the copper wires 4311 are prevented from being partially deformed to an outer side of the lead wire 43 due to contact between the connecting end 4313 and the peripheral edge of the through hole 4241c. As a result, during ultrasonic welding, it is possible to prevent the copper wire 4311 from being brought into contact with the lead wire connecting portion 4241b circumferentially adjacent to the lead wire connecting portion 4241b to be welded, and there is thus provided a resolver of high reliability. In a case where the insertion through portion 6242 is formed as an opening having a diameter reduced toward the lead wire connecting portion 4241b as shown in FIG. 16, the insertion through portion 6242 may be formed to have a circumferential width at a position where the insertion through portion 6242 is in contact with the lead wire connecting portion 4241b smaller than the wire diameter of the lead wire 43 as long as it is formed larger than the wire diameter of the connecting end 4313.

Referring to FIG. 18, an insertion through portion 7242 is formed to cover the radial outer side of the lead wire connecting portion 4241b. In other words, the terminal block 424 is provided with wall portions having approximately the same length as a length of the lead wire connecting portions 4241b in the longitudinal direction. The wall portions are arranged circumferentially between the lead wire connecting portions 4241b. With this configuration, when ultrasonic welding is carried out for the connecting end 4313 and the lead wire connecting portion 4241b, it is possible to reliably prevent the copper wire 4311 from being brought into contact with the lead wire connecting portion 4241b circumferentially adjacent to the lead wire connecting portion 4241b to be welded. Therefore, there is provided a resolver of high reliability.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A resolver comprising:
a resolver rotor rotatable about a central axis and including a non-circular outer peripheral surface;
a resolver stator centered about the central axis and including an inner peripheral surface radially opposed to the outer peripheral surface of the resolver rotor with a gap provided therebetween; and
a lead wire arranged to electrically connect the resolver to another device; wherein
the resolver stator includes:
　a resolver stator core including a plurality of teeth and a core back portion arranged to connect the teeth to one another, the teeth being circumferentially spaced apart from one another and extending toward the central axis;
　an insulator arranged to cover at least the teeth of the resolver stator; and
　a plurality of coil windings defined by conductive wires wound around the respective teeth with the insulator arranged therebetween;
the insulator includes an integral terminal block that is arranged to project radially outwards from the resolver stator core and includes a plurality of terminals arranged to electrically connect the lead wire and the conductive wires to each other; and
each of the terminals is approximately L-shaped, and includes a conductive wire connecting portion and a lead wire connecting portion which are integral with each other, the conductive wire connecting portion axially projects from the terminal block and is arranged to be connected to a corresponding one of the conductive wires, the lead wire connecting portion is arranged on an opposite side of the terminals in the axial direction with respect to the conductive wire connecting portion and projects radially outwards from the conductive wire connecting portion, and the terminals are arranged in a direction approximately perpendicular to a projecting direction of the terminal block.

2. A resolver comprising:
a resolver rotor rotatable about a central axis and including a non-circular outer peripheral surface;
a resolver stator centered about the central axis and including an inner peripheral surface radially opposed to the outer peripheral surface of the resolver rotor with a gap provided therebetween; and
a lead wire arranged to electrically connect the resolver to another device; wherein
the resolver stator includes:
　a resolver stator core including a plurality of teeth and a core back portion arranged to connect the teeth to one another, the teeth being circumferentially spaced apart from one another and extending toward the central axis;
　an insulator arranged to cover at least the teeth of the resolver stator; and
　a plurality of coil windings defined by conductive wires wound around the respective teeth with the insulator arranged therebetween;
the insulator includes an integral terminal block that is arranged to project radially outwards from the resolver stator core and includes a plurality of terminals arranged to electrically connect the lead wire and the conductive wires to each other;
each of the lead wire and the terminals has a melting portion to be melted;
the lead wire includes a plurality of copper wire bundles each covered with an insulating film, and includes connecting ends to be connected to the terminals, respectively, each of the connecting ends including only the copper wire bundles, and all the copper wire bundles are twisted at a portion of the lead wire; and
each of the terminals is approximately L-shaped, and includes a conductive wire connecting portion and a lead wire connecting portion which are integral with each other, the conductive wire connecting portion axially projects from the terminal block and is arranged to be connected to a corresponding one of the conductive wires, the lead wire connecting portion is arranged on an opposite side of the terminals in the axial direction with respect to the conductive wire connecting portion and projects radially outwards from the conductive wire connecting portion, and the terminals are arranged in a direction approximately perpendicular to a projecting direction of the terminal block.

3. The resolver according to claim 2, wherein the lead wire connecting portion is approximately rectangular and flat, and has a circumferential width larger than or approximately the same as a diameter of each of the copper wire bundles.

4. The resolver according to claim 2, wherein the lead wire connecting portion has a through hole which axially penetrates through the lead wire connecting portion, at least the connecting end of the lead wire being inserted into the through hole, and the connecting end of the lead wire is fixed onto a surface of the lead wire connecting portion on the other side in the axial direction.

5. The resolver according to claim 4, wherein the through hole is elongated in a longitudinal direction of the lead wire connecting portion.

6. The resolver according to claim 2, wherein the terminal block is provided at its radial end with insertion through portions which are associated with the terminals, respectively, and the copper wire bundles of the lead wire are approximately axially inserted into the insertion through portions, respectively.

7. The resolver according to claim 6, wherein at least a surface of each of the insertion through portions, which faces the resolver stator core, is at an angle with respect to an axial direction that is substantially parallel to the central axis in such a manner that it moves radially inwards as it moves closer to the resolver stator core.

8. The resolver according to claim 6, wherein the lead wire connecting portion has a through hole which axially penetrates through the lead wire connecting portion, at least the connecting end of the lead wire being inserted into the through hole, and a circumferential width of each of the insertion through portions is approximately the same as or larger than a circumferential width of the through hole.

9. The resolver according to claim 6, wherein each of the insertion through holes has an opening opened radially outwards, and
a circumferential width of the opening is approximately the same as or smaller than a diameter of each of the copper wire bundles of the lead wire.

10. The resolver according to claim 6, wherein the lead wire connecting portion has a through hole which axially penetrates through the lead wire connecting portion, at least the connecting end of the lead wire being inserted into the through hole, and the through hole is arranged in the lead wire connecting portion of each of the terminals at approximately the same radial and circumferential position as an associated one of the through insertion portions of the terminal block.

11. The resolver according to claim 6, wherein the lead wire connecting portion is arranged on the one side of the other side surface of the terminal block in the axial direction, and has wall portions having approximately the same length as a length of the lead wire connecting portions of the terminals in the longitudinal direction, and the wall portions are provided circumferentially between the lead wire connecting portions of the terminals.

12. A motor comprising:
the resolver according to claim 2;
a rotating body having a shaft rotatable about the central axis; and
a stationary body having an armature radially facing the rotating body with a gap arranged therebetween.

13. The motor according to claim 12, wherein a bus bar unit having an approximately circular arc shape, which allows wire connection of the armature, is provided at one axial end of the armature and has a cut out portion, the resolver is radially overlapped with the bus bar unit, and the terminal block of the resolver is arranged in the cut out portion.

* * * * *